United States Patent
Hamamoto et al.

(10) Patent No.: US 7,886,078 B2
(45) Date of Patent: Feb. 8, 2011

(54) CONNECTION SUPPORT SERVER AND COMMUNICATION APPARATUS

(75) Inventors: Moe Hamamoto, Osaka (JP); Takeshi Kokado, Kyoto (JP); Ikue Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 197 days.

(21) Appl. No.: 12/293,859

(22) PCT Filed: Mar. 19, 2007

(86) PCT No.: PCT/JP2007/055528
§ 371 (c)(1),
(2), (4) Date: Sep. 22, 2008

(87) PCT Pub. No.: WO2007/114035
PCT Pub. Date: Oct. 11, 2007

(65) Prior Publication Data
US 2009/0037528 A1    Feb. 5, 2009

(30) Foreign Application Priority Data
Mar. 30, 2006  (JP) ............................... 2006-093991

(51) Int. Cl.
*G06F 15/173* (2006.01)
(52) U.S. Cl. ........................ 709/238; 709/220; 709/223; 709/250
(58) Field of Classification Search ................. 709/220, 709/223, 238, 250
See application file for complete search history.

(56) References Cited

U.S. PATENT DOCUMENTS

| | | | |
|---|---|---|---|
| 7,385,973 B1 * | 6/2008 | Johnson et al. | 370/389 |
| 7,408,934 B2 * | 8/2008 | Fukuda | 370/392 |
| 7,633,948 B2 * | 12/2009 | Yokomitsu et al. | 370/395.54 |
| 7,733,885 B2 * | 6/2010 | Ayyagari et al. | 370/401 |
| 2003/0061380 A1 * | 3/2003 | Saito et al. | 709/238 |
| 2003/0095524 A1 * | 5/2003 | Stephens et al. | 370/338 |
| 2003/0097425 A1 * | 5/2003 | Chen | 709/220 |
| 2004/0017814 A1 * | 1/2004 | Shimada | 370/395.52 |
| 2005/0041596 A1 * | 2/2005 | Yokomitsu et al. | 370/252 |
| 2007/0123245 A1 * | 5/2007 | Hu | 455/422.1 |

OTHER PUBLICATIONS

International Search Report mailed Jun. 5, 2007 for International Application No. PCT/JP2007/055528.

* cited by examiner

*Primary Examiner*—Oanh Duong
(74) *Attorney, Agent, or Firm*—Wenderoth, Lind & Ponack L.L.P.

(57) ABSTRACT

A low cost communication apparatus enables detection of an apparatus present on a different network in a router multistage network having a plurality of routers. When a communication apparatus cannot detect, on a network thereof, a desired apparatus, the communication apparatus requests a connection support server securing communication paths with all the apparatuses on a home network, to relay an apparatus detection request. The connection support server transfers the request to relay the apparatus detection request, to an arbitrary apparatus belonging to a different network from the network to which the communication apparatus belongs, and the arbitrary apparatus, by proxy, performs an apparatus detection, and transfers information about a detected apparatus to the connection support server. By obtaining the information from the connection support server, the communication apparatus detects the apparatus on the different network.

16 Claims, 17 Drawing Sheets

F I G. 1 2
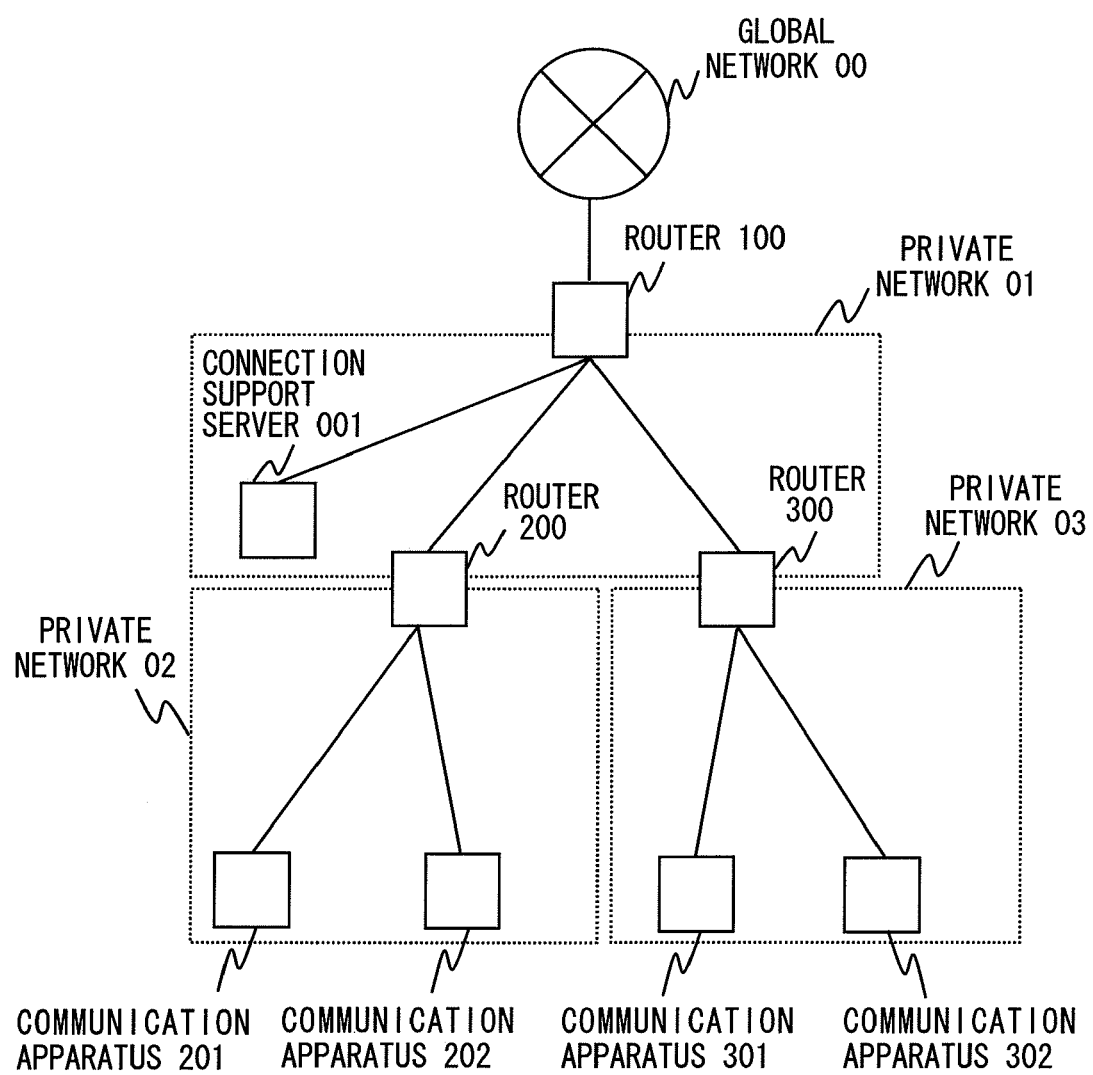

CONNECTION SUPPORT SERVER AND COMMUNICATION APPARATUS

TECHNICAL FIELD

The present invention relates to a connection support server and a communication apparatus, and relates to a connection support server and a communication apparatus which enable detection of an apparatus present on a different network in a network comprising a plurality of routers.

BACKGROUND ART

While always-on Internet connections are widespread and various services have appeared accordingly, there is a demand to be able to receive such services in various places at home. Generally speaking, each home has a different home network configuration, and apparatuses used therein are various such as PCs, Internet appliances and the like. However, there is problem that connection settings or connection operations of Internet appliances are difficult for general users who do not have technical knowledge of such a network, and it is also difficult to establish a connection between apparatuses if a configuration of the network, such as a connection mode, router type or the like, is not taken into account.

In order to solve this problem, there is a technique called UPnP (Universal Plug and Play) stipulated by the UPnP Forum, which allows apparatuses within a home network to be interconnected.

By using UPnP, an apparatus within a home network can be automatically searched for and detected by multicasting, and an interconnection with the detected apparatus can be established.

FIG. 17A shows a home network comprising conventional UPnP apparatuses. In FIG. 17A, a modem having a router function, which is rented from an Internet service provider, is connected to a PC, a television and a VCR. FIG. 17B shows a process for detecting an apparatus by UPnP, which is performed in the case of operating the VCR from the PC.

In FIG. 17B, the PC first multicasts, on the network, an apparatus detection request which contains information indicating that a search target is the VCR (step S201). The apparatus detection request is received by all the UPnP apparatuses on the network, and each apparatus determines whether or not the search target is said each apparatus.

The VCR determines that the search target is the VCR, and transmits, to the PC which is a transmission source of the request, an apparatus detection response which contains necessary information for operating the VCR (step S202). By receiving the apparatus detection response, the PC is enabled to operate the VCR.

Using UPnP in this manner enables UPnP apparatuses to be interconnected.

In recent years, however, it has become common that a user connects a router having a wireless function, which the user has purchased, to a modem which functions as a router and which is rented from an Internet service provider, such that each router has apparatuses subordinately connected thereto as shown in FIG. 18A (hereinafter, this type of network configuration will be referred to as a router multistage configuration). FIG. 18B shows a process for detecting an apparatus by UPnP, which is performed when it is desired in FIG. 18A to control a VCR from a PC.

As shown in FIG. 18B, the PC first multicasts, on a network thereof, an apparatus detection request which contains information indicating that a search target is the VCR (step S301). The apparatus detection request is received by all the UPnP apparatuses on the network (a wireless router and a television T2 in FIG. 18A), and each apparatus determines whether or not said each apparatus is the search target.

Here, a general commercially available household router is configured, in consideration of security, so as not to transfer a multicast packet to another network. For this reason, in the router multistage configuration as shown in FIG. 18A, the wireless router does not transfer, to a private network N1, an apparatus detection request packet received from the PC. Therefore, the VCR which is the search target cannot receive the apparatus detection request, and does not return an apparatus detection response. Accordingly, an apparatus detection response reception waiting time-out occurs in the PC (step S302), and thus the apparatus detection fails (step S303).

As described above, in the router multistage configuration, an apparatus on the same network can be detected using UPnP multicasting. However, an apparatus on a different network cannot be detected.

Conventionally, there are a disclosed network connection apparatus and method (e.g., Patent Document 1) in which a plurality of networks, each of which is independently configured, are connected such that a plurality of devices on the respective networks can be interconnected.

According to the network connection apparatus and method of Patent Document 1, the plurality of networks, each of which is independently configured, are respectively provided with network connection apparatuses, and each network connection apparatus manages information about apparatuses on a corresponding network. The network connection apparatuses exchange such information each other, and this enables apparatuses on different networks to be interconnected.

FIG. 19A shows a router multistage home network in which gateways each including the network connection apparatus of Patent Document 1 are provided. It is assumed here that a network connection apparatus D1 has already obtained, as access information about a network connection apparatus D2, an IP address and a port number of a gateway G2, and the network connection apparatus D2 has already obtained, as access information about the network connection apparatus D1, an IP address and a port number of a gateway G1. FIG. 19B shows a process for detecting an apparatus by using the network connection apparatus and method of Patent Document 1, which process is performed in the case of operating a VCR from a PC in FIG. 19A.

As shown in FIG. 19B, the network connection apparatus D1 collects, by multicasting an apparatus detection request, information about apparatuses (television T1, VCR) on a private network N1 (step S401). Similarly, the network connection apparatus D2 collects, by multicasting an apparatus detection request, information about apparatuses (PC, television T2) on a private network N2 (step S402).

Next, the PC on the private network N2 transmits, to the network connection apparatus D2, an apparatus detection request which contains information indicating that a search target is the VCR (step S403). Upon receiving the request, the network connection apparatus D2 sets an IP address and a port number of the gateway G1 as a transmission destination, and then transfers the apparatus detection request to the network connection apparatus D1 (step S404). The network connection apparatus D1 searches the apparatus information obtained at step S401 for information about the VCR which is the search target contained in the received apparatus detection request, and transmits the information about the VCR to the network connection apparatus D2 as an apparatus detection response (step S405). Upon receiving the apparatus detection response, the network connection apparatus D2 transfers the response to the PC which is a transmission source of the request (step S406). In the above manner, the PC is enabled to operate the VCR which is on a different network.

[Patent Document 1] Japanese Laid-Open Patent Publication No. 2004-320741

SUMMARY OF THE INVENTION

Problems to be Solved by the Invention

However, the method disclosed in Patent Document 1 needs to meet requirements described below in order to realize an interconnection between apparatuses on different networks.

A first requirement is that networks divided by gateways are each required to have one network connection apparatus.

A second requirement is to input address information about each gateway to each network connection apparatus.

For example, in the case of a home network having a router multistage configuration, a same number of network connection apparatuses as a number of provided routers (i.e., as a number of networks divided by the routers) are necessary in order to meet the first requirement. This causes a problem that a cost for the user becomes a substantial amount.

Also, in order to meet the second requirement, it is necessary for the user to manually set, for all the network connection apparatuses, address information about all the routers, and thus the general user who does not have enough network knowledge is required to do difficult troublesome work. A conceivable manner to eliminate the necessity for the user to do such work is to mount, on each router, a network connection apparatus which has a mechanism for exchanging address information, or to provide routers each having a mechanism for exchanging router address information. However, replacing all the routers in the home network with dedicated routers still causes the problem that the cost for the user becomes a substantial amount.

Therefore, an object of the present invention is, in view of the above-described problem, to provide a communication apparatus which allows a network to be configured with a low cost and a simple process.

Solution to the Problems

The present invention is directed to a communication apparatus having a connection support server function, which is, in a network comprising a plurality of subnetworks connected via a plurality of NAT devices, connected to an arbitrary subnetwork in the network and which has an established communication path with a communication apparatus connected to a different subnetwork from the subnetwork to which the communication apparatus having the connection support server function is connected. In order to achieve the above object, the communication apparatus of the present invention comprises: a relay request transfer section for, when receiving from an arbitrary communication apparatus a relay request for an apparatus detection request, transferring to another communication apparatus the relay request for the apparatus detection request; and an apparatus detection response transfer section for, when receiving an apparatus detection response, transferring the received apparatus detection response to the communication apparatus which is a transmission source of the relay request. When receiving the relay request for the apparatus detection request, the relay request transfer section transfers the relay request for the apparatus detection request, to an arbitrary communication apparatus connected to a different subnetwork from a subnetwork to which the communication apparatus which is the transmission source of the relay request is connected. The apparatus detection response transfer section has the connection support server function for, when receiving the apparatus detection response from the communication apparatus to which the relay request for the apparatus detection request has been transferred, transferring the apparatus detection response to the communication apparatus which is a transmission source of the apparatus detection request.

This enables the communication apparatus, which is the transmission source of the apparatus detection request, to detect a communication apparatus present on a different subnetwork.

Preferably, the communication apparatus further comprises: an apparatus detection request transmission section for multicasting or broadcasting, on the subnetwork thereof, an apparatus detection request for a desired communication apparatus; a relay request transmission section for transmitting a relay request for the apparatus detection request, to the communication apparatus on the different subnetwork; and an apparatus detection response receiving section for receiving an apparatus detection response. The apparatus detection request transmission section transmits, on the subnetwork thereof, the apparatus detection request for the desired communication apparatus. In the case where the apparatus detection response receiving section does not receive the apparatus detection response to the apparatus detection request, the relay request transmission section transmits the relay request for the apparatus detection request, to the communication apparatus on the different subnetwork. The apparatus detection response receiving section receives the apparatus detection response to the relay request, thereby detecting the desired communication apparatus.

This enables the communication apparatus of the present invention to detect a desired communication apparatus within the network.

When receiving, from the communication apparatus on the different subnetwork, the relay request for the apparatus detection request, the relay request transfer section performs an apparatus detection on the subnetwork thereof, by multicasting or broadcasting the apparatus detection request, and transfers the relay request for the apparatus detection request, to an arbitrary communication apparatus on all other subnetworks.

This allows the communication apparatus of the present invention to omit steps in which the apparatus detection request is relayed, on the subnetwork of the communication apparatus, to an arbitrary communication apparatus and the arbitrary apparatus on the subnetwork performs multicasting or broadcasting. Accordingly, a time consumed for the search can be reduced.

When the relay request transfer section has received, on the subnetwork thereof, a multicasted or broadcasted apparatus detection request from a communication apparatus on the subnetwork, the relay request transfer section transmits a relay request for the apparatus detection request, to an arbitrary communication apparatus on the different subnetwork.

This enables the communication apparatus of the present invention to perform an apparatus detection on the different subnetwork at the same time as a communication apparatus, which is present on the subnetwork of the communication apparatus of the present invention and which has multicasted or broadcasted the apparatus detection request on the subnetwork, waits for a response to the apparatus detection request. Accordingly, a time to be consumed when an apparatus to detect is not present on the subnetwork, can be reduced.

The relay request transfer section stores information about communication apparatuses, and when receiving the relay request for the apparatus detection request, the relay request transfer section determines, based on the information about the communication apparatuses, a communication apparatus to which the relay request is to be transferred.

This enables the communication apparatus of the present invention to always cause only an apparatus having a high processing capability to multicast or broadcast the apparatus detection request, and thereby prevent a processing load from being imposed on a communication apparatus having a low processing capability. This also allows the communication apparatus of the present invention to always request a different communication apparatus to multicast or broadcast the apparatus detection request, in order for the processing to be performed in a dispersed manner. As a result, stability of the network can be obtained.

The communication apparatus further comprises a relay rejection response receiving section for receiving a rejection response to the relay request for the apparatus detection request. When receiving the rejection response, the relay rejection response receiving section transfers the relay request for the apparatus detection request, to a different communication apparatus from a communication apparatus which is a transmission source of the rejection response, the different communication apparatus existing on a same subnetwork as that of the communication apparatus which is the transmission source of the rejection response.

This allows the communication apparatus of the present invention to, in the case where a communication apparatus which is requested to relay the apparatus detection request is unable to multicast or broadcast the apparatus detection request due to a load imposed thereon, request another communication apparatus, on which a processing load is not imposed, to relay the apparatus detection request. This prevents the communication apparatus from becoming incapable of performing processing.

The present invention is also directed to a communication apparatus which is, in a network comprising a plurality of subnetworks connected via a plurality of NAT devices, connected to an arbitrary subnetwork in the network and which has an established communication path with a communication apparatus which has a communication path connected to a communication apparatus on the network and which has a connection support server function. In order to achieve the above object, the communication apparatus of the present invention comprises: an apparatus detection request transmission section for multicasting or broadcasting, on the subnetwork thereof, an apparatus detection request for a desired communication apparatus; a relay request transmission section for transmitting a relay request for the apparatus detection request, to the communication apparatus having the connection support server function; and an apparatus detection response receiving section for receiving an apparatus detection response. The apparatus detection response receiving section receives the apparatus detection response from the desired communication apparatus or from the communication apparatus having the connection support server function, thereby detecting the desired communication apparatus.

This allows the communication apparatus of the present invention to detect a communication apparatus on a different subnetwork.

In the case where the apparatus detection response receiving section does not receive the apparatus detection response to the apparatus detection request, the relay request transmission section transmits the relay request for the apparatus detection request, to the communication apparatus having the connection support server function.

This allows the communication apparatus of the present invention to, only when a desired communication apparatus is not present on the subnetwork of the communication apparatus of the present invention, perform the relay request for the apparatus detection request, whereby an unnecessary packet transmission on the network can be prevented.

At the same time as the apparatus detection request transmission section multicasts or broadcasts the apparatus detection request on the subnetwork thereof, the relay request transmission section transmits the relay request for the apparatus detection request, to the communication apparatus having the connection support server function.

This enables the communication apparatus of the present invention to, in the case where a desired communication apparatus is not present on the subnetwork of the communication apparatus of the present invention, perform an apparatus detection on a different subnetwork at the same time as waiting for a response reception. Accordingly, a time, which is consumed until the desired communication apparatus is detected, can be reduced.

The communication apparatus further comprises a relay request processing section for multicasting or broadcasting an apparatus detection request on the subnetwork thereof when receiving, from the communication apparatus having the connection support server function, a relay request for the apparatus detection request. When the apparatus detection response receiving section has received the apparatus detection response, the relay request processing section transfers the received apparatus detection response to the communication apparatus having the connection support server function.

This allows the communication apparatus of the present invention to perform detection of a communication apparatus on the subnetwork of the communication apparatus of the present invention, by proxy for a communication apparatus on another subnetwork, and transfer the response via the communication apparatus having the connection support server function. This enables the communication apparatus which is a transmission source of the relay request to detect the communication apparatus present on a different subnetwork.

The communication apparatus further comprises a relay rejection response transmission section for, when the relay request processing section has received, from the communication apparatus having the connection support server function, the relay request for the apparatus detection request and determined that a processing capability of the relay request processing section is insufficient for multicasting or broadcasting the apparatus detection request on the subnetwork thereof, transmitting, to the communication apparatus having the connection support server function, a rejection response to the relay request for the apparatus detection request.

This allows, in the case where the communication apparatus of the present invention is, when receiving the relay request for the apparatus detection request, unable to multicast or broadcast the apparatus detection request due to a processing load imposed thereon, the communication apparatus to reject the request. This prevents the communication apparatus from becoming incapable of performing processing.

The above-described series of processing sequences performed by the communication apparatuses may be implemented as methods to be executed by the communication apparatuses. Further, the present invention may be a storage medium for storing software in which the methods are implemented.

EFFECT OF THE INVENTION

The present invention enables detection of a desired communication apparatus whichever network the communication apparatus belongs to in a router multistage home network, and prevents misplacement of a communication apparatus even if a user does not have special knowledge. Further, routers to be used in the home network may be commercially available routers, and only one apparatus on the home network is required to have a connection support server function. Therefore, a cost for the user can be reduced.

BRIEF DESCRIPTION OF THE DRAWINGS

FIG. 12 shows an exemplary configuration of an entire system according to a third embodiment of the present invention.

Figure 1:
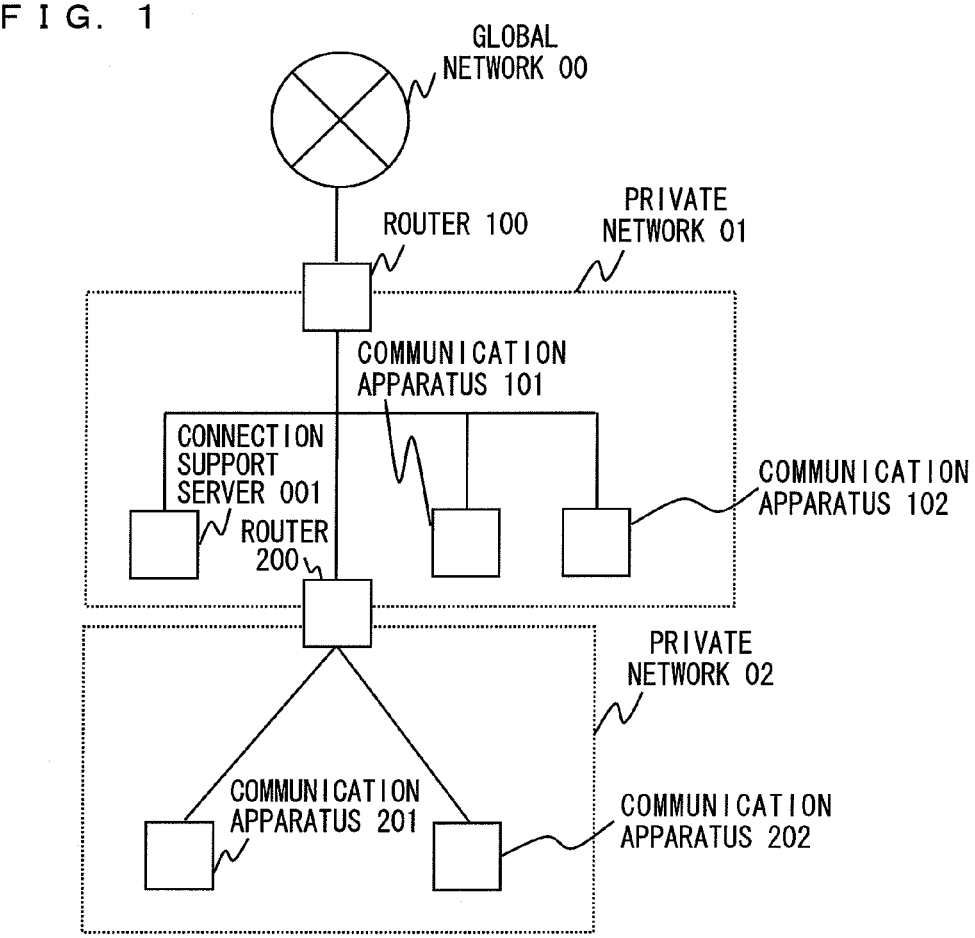
FIG. 1 shows an exemplary configuration of an entire system according to a first embodiment of the present invention.

DESCRIPTION OF THE REFERENCE CHARACTERS 00 global network
00, 02 private network
001 server
100, 200, 300 router
101, 202, 301, 401 communication apparatus
102, 201, 302 communication apparatus
0011 relay request transfer section
0012 apparatus detection response transfer section
0013 relay rejection response receiving section
0014 communication path information storage section
0015 communication section
1011, 2021, 3011, 4011 apparatus detection request transmission section
1012, 2022, 3012, 4012 apparatus detection response receiving section
1013, 2023, 3013, 4013 relay request transmission section
1014, 2024, 3014, 4014 relay request processing section
1015, 2025, 3015, 4015 communication section
1021, 2011, 3021 apparatus detection request receiving section
1022, 2012, 3022 apparatus detection response transmission section
1023, 2013, 3023 communication section

DETAILED DESCRIPTION OF THE INVENTION

First Embodiment

Hereinafter, a first embodiment of the present invention will be described with reference to the drawings.

FIG. 1 shows an exemplary configuration of an entire system according to the first embodiment of the present invention.

As shown in FIG. 1, a global network 00 and a private network 01 are connected via a router 100. The router 100 has a global IP address [IPW 100] as a WAN address, and a private IP address [IPL 100] as a LAN address.

The private network 01 and a private network 02 are connected via a router 200. The router 200 has a private IP address [IPW 200] as a WAN address and a private IP address [IPL 200] as a LAN address.

A communication apparatus 101 having a private IP address [IPL 101] and a communication apparatus 102 having a private IP address [IPL 102] are connected to the private network 01.

A communication apparatus 201 having a private IP address [IPL 201] and a communication apparatus 202 having a private IP address [IPL 202] are connected to the private network 02.

A connection support server 001 having a private IP address [IPL 001] is connected to the private network 01. The connection support server 001 has established communication paths through which the connection support server 001 can interactively communicate with all the communication apparatuses connected to the private network 01 and the private network 02.

Figure 2:
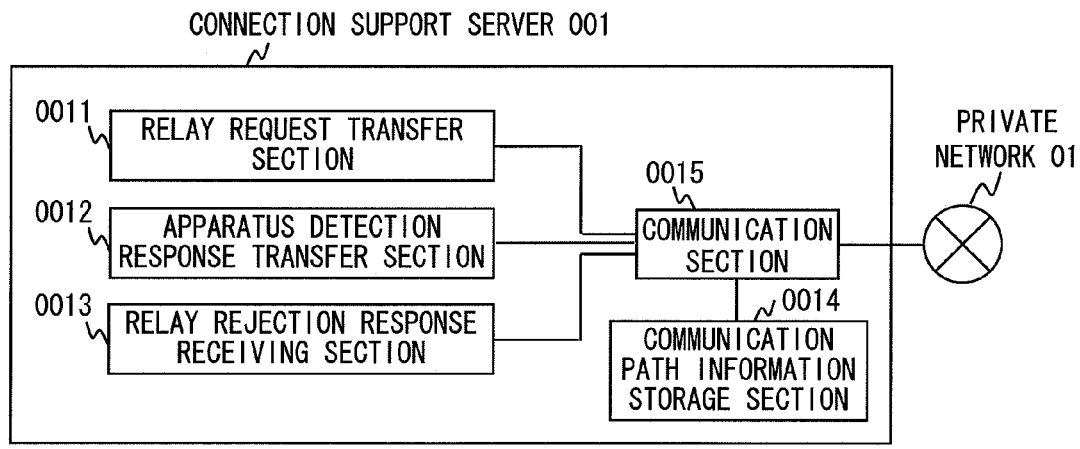
FIG. 2 is a block diagram showing an exemplary configuration of a connection support server 001 according to the first embodiment of the present invention.
Figure 3A:
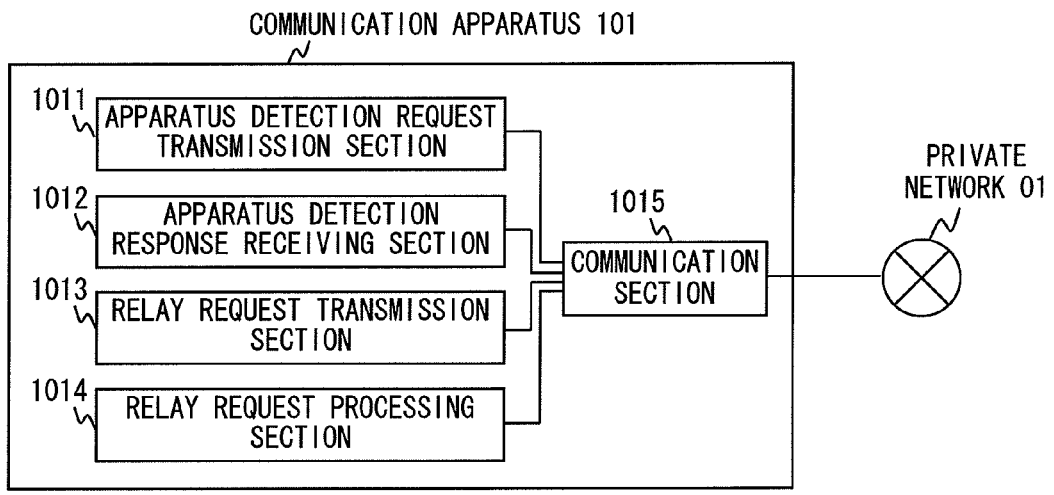
FIG. 3A is a block diagram showing an exemplary configuration of a communication apparatus 101 according to the first embodiment of the present invention.
Figure 3B:
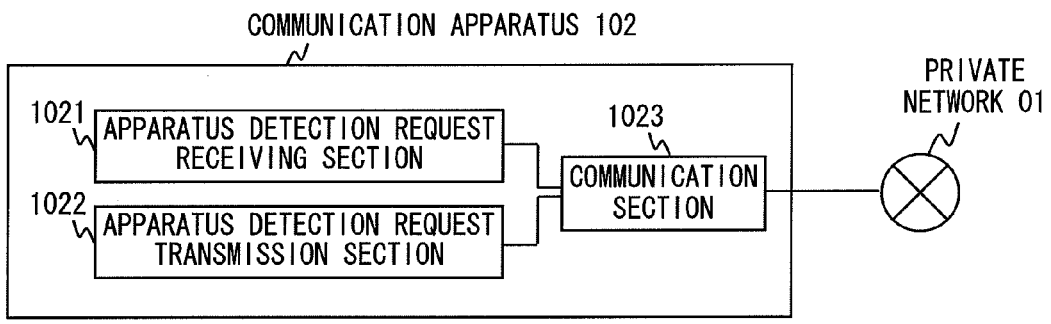
FIG. 3B is a block diagram showing an exemplary configuration of a communication apparatus 102 according to the first embodiment of the present invention.
Figure 3C:
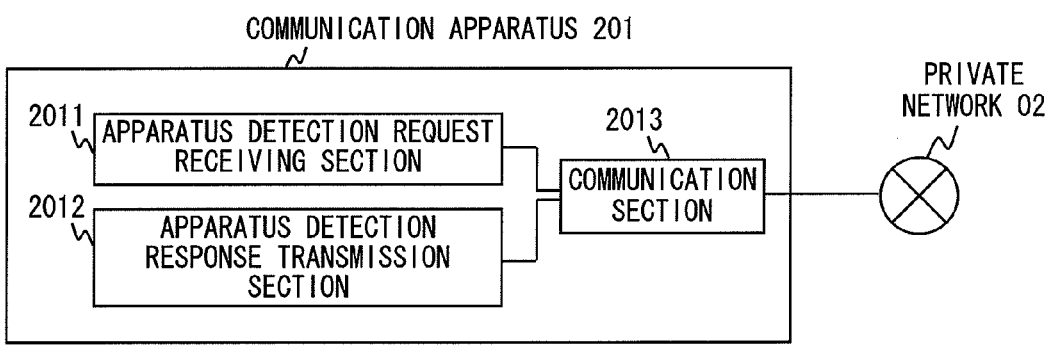
FIG. 3C is a block diagram showing an exemplary configuration of a communication apparatus 201 according to the first embodiment of the present invention.
Figure 3D:
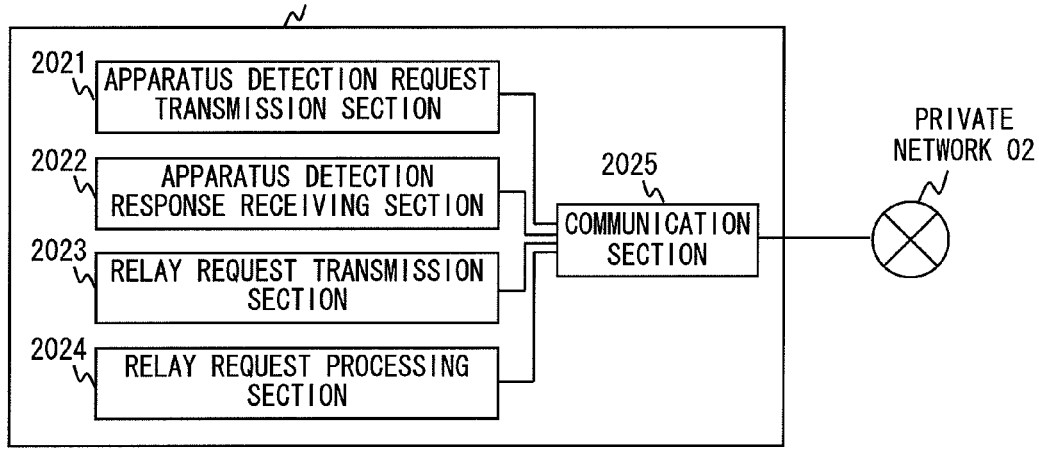
FIG. 3D is a block diagram showing an exemplary configuration of a communication apparatus 202 according to the first embodiment of the present invention.

FIG. 2 is a block diagram showing an exemplary configuration of the connection support server 001 according to the first embodiment of the present invention. FIG. 3A is a block diagram showing an exemplary configuration of the communication apparatus 101 according to the first embodiment of the present invention. FIG. 3B is a block diagram showing an exemplary configuration of the communication apparatus 102 according to the first embodiment of the present invention. FIG. 3C is a block diagram showing an exemplary configuration of the communication apparatus 201 according to the first embodiment of the present invention. FIG. 3D is a block diagram showing an exemplary configuration of the communication apparatus 202 according to the first embodiment of the present invention.

As shown in FIG. 2, the connection support server 001 comprises: a relay request transfer section 0011 for, when receiving from an arbitrary communication apparatus a request to relay an apparatus detection request, transferring to a different communication apparatus the request to relay the apparatus detection request; an apparatus detection response transfer section 0012 for, when receiving an apparatus detection response, transferring the apparatus detection response to the apparatus which is a transmission source of the relay request; a relay rejection response receiving section 0013 for receiving a rejection response to the relay request for the apparatus detection request, from the communication apparatus to which the relay request has been transferred; a communication path information storage section 0014 for storing information about communication paths to all the communication apparatuses; and a communication section 0015 for performing all the communications. Mounting these functional sections on an arbitrary Internet appliance eliminates the necessity to have a dedicated apparatus which functions as the connection support server, thereby reducing a cost for a user. Note that, the connection support server 001 may not necessarily have the relay rejection response receiving section 0013.

As shown in FIG. 3A, the communication apparatus 101 comprises: an apparatus detection request transmission section 1011 for multicasting or broadcasting, on a network thereof, an apparatus detection request for an apparatus which is desired to establish a communication with the communication apparatus 101; a relay request transmission section 1013 for transmitting, to the connection support server 001, a request to relay the apparatus detection request; an apparatus detection response receiving section 1012 for receiving an apparatus detection response; a relay request processing section 1014 for, when receiving from the connection support server 001 a request to relay an apparatus detection request, multicasting or broadcasting the apparatus detection request on the network of the communication apparatus 101; and a communication section 1015 for performing all the communications. The communication apparatus 101 is, for example, a PC or remote controller for operating another apparatus.

As shown in FIG. 3B, the communication apparatus 102 comprises: an apparatus detection request receiving section 1021 for receiving an apparatus detection request which is multicasted or broadcasted on a network thereof, and determining whether or not a search target contained in the received apparatus detection request is the communication apparatus 102; an apparatus detection response transmission section 1022 for transmitting an apparatus detection response when the search target is the communication apparatus 102; and a communication section 1023 for performing all the communications. The communication apparatus 102 is, for example, a television or VCR which is operated by another apparatus.

As shown in FIG. 3C, the communication apparatus 201 comprises: an apparatus detection request receiving section 2011 for receiving an apparatus detection request which is multicasted or broadcasted on a network thereof, and determining whether or not a search target contained in the received apparatus detection request is the communication apparatus 201; an apparatus detection response transmission section 2012 for transmitting an apparatus detection response when the search target is the communication apparatus 201; and a communication section 2013 for performing all the communications. The communication apparatus 201 is, for example, a television or VCR which is operated by another apparatus.

As shown in FIG. 3D, the communication apparatus 202 comprises: an apparatus detection request transmission section 2021 for multicasting or broadcasting, on a network thereof, an apparatus detection request for an apparatus which is desired to establish a communication with the communication apparatus 202; a relay request transmission section 2023 for transmitting, to the connection support server 001, a request to relay the apparatus detection request; an apparatus detection response receiving section 2022 for receiving an apparatus detection response; a relay request processing section 2024 for, when receiving from the connection support server 001 a request to relay an apparatus detection request, multicasting or broadcasting the apparatus detection request on the network of the communication apparatus 202; and a communication section 2025 for performing all the communications. The communication apparatus 202 is, for example, a PC or remote controller for operating another apparatus.

Described below in the present embodiment is an apparatus detection process which is performed in the case where the connection support server 001 is connected to the private network 01.

Figure 4:
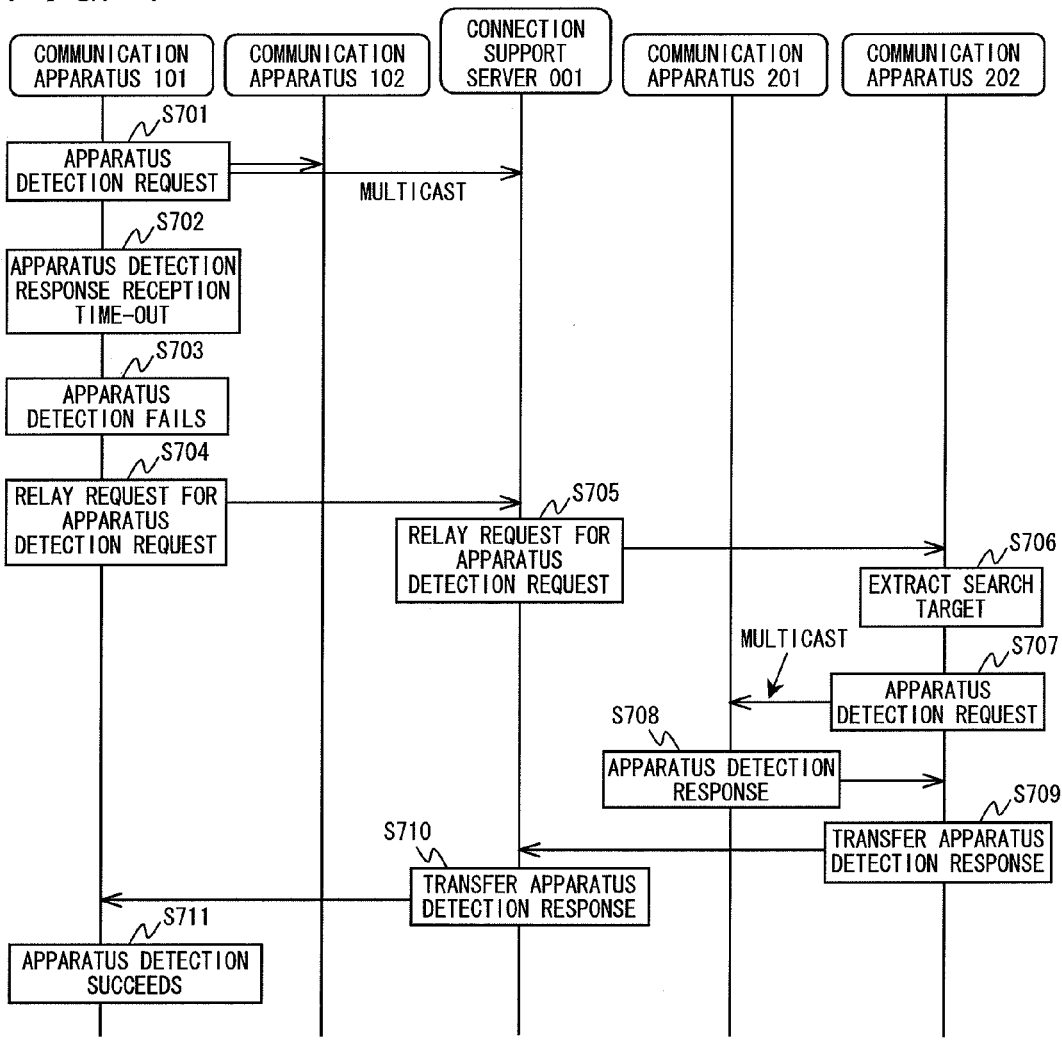
FIG. 4 shows a processing sequence, of the first embodiment of the present invention, for detecting the communication apparatus 201 connected to a subordinate network from the communication apparatus 101 connected to a superordinate network.

Described first with reference to FIG. 4 is a process in which the communication apparatus 101 on the private network 01 detects the communication apparatus 201 on the private network 02.

The apparatus detection request transmission section 1011 of the communication apparatus 101 multicasts via the communication section 1015, on the private network 01 to which the communication apparatus 101 is connected, an apparatus detection request which designates the communication apparatus 201 as a search target (step S701). Since the communication apparatus 201 is not present on the private network 01 and the router 200 does not transfer the apparatus detection request to the private network 02, a reception time-out occurs in the apparatus detection response receiving section 1012 for an apparatus detection response to be received from the communication apparatus 201 (step S702). Thus, the apparatus detection fails (step S703).

When the apparatus detection fails on the network of the communication apparatus 101, the relay request transmission section 1013 of the communication apparatus 101 transmits, to the relay request transfer section 0011 of the connection support server 001 via the communication section 1015, a request to relay the apparatus detection request (step S704).

When the relay request transfer section 0011 receives the relay request from the communication apparatus present on the network of the connection support server 001, the relay request transfer section 0011 selects, from the information stored in the communication path information storage section 0014, an arbitrary apparatus of each of all the networks other than the network of the connection support server 001 (here, only the private network 02) (in this case, the communication apparatus 202 is selected), with which arbitrary apparatus a connection is to be established. Then, the relay request transfer section 0011 transmits, to the arbitrary apparatus via the communication section 0015, the relay request for the apparatus detection request (step S705).

Upon receiving the relay request from the connection support server 001, the relay request processing section 2024 of the communication apparatus 202 extracts the search target (communication apparatus 201) from the relay request for the apparatus detection request (step S706), and multicasts, on the private network 02, the apparatus detection request containing the extracted information, from the apparatus detection request transmission section 2021 via the communication section 2025 (step S707).

Upon receiving the apparatus detection request, the apparatus detection request receiving section 2011 of the communication apparatus 201 determines that the communication apparatus 201 is designated as the search target, and then transmits an apparatus detection response from the apparatus detection response transmission section 2012 to the relay request processing section 2024 of the communication apparatus 202 via the communication section 2013 (step S708).

Upon receiving the apparatus detection response, the relay request processing section 2024 transmits the response to the apparatus detection response transfer section 0012 of the connection support server 001 (step S709), and then the apparatus detection response transfer section 0012 transfers the apparatus detection response to the apparatus detection response receiving section 1012 of the communication apparatus 101 (step S710).

By receiving the apparatus detection response at the apparatus detection response receiving section 1012 of the communication apparatus 101, the apparatus detection succeeds in detecting the communication apparatus 201 on the different private network (step S711).

Here, at step S701, at the same time as the communication apparatus 101 multicasts, on the network thereof, the apparatus detection request from the apparatus detection request transmission section 1011, the communication apparatus 101 may transmit, from the relay request transmission section 1013 to the relay request transfer section 0011 of the connection support server 001, the relay request for the apparatus detection request.

Accordingly, when an apparatus to detect is not present on the network of the communication apparatus 101, the apparatus detection can be performed on a different network at the same time as the communication apparatus 101 waits for a response to be received. This allows a time, which is consumed until the apparatus is detected, to be reduced.

Further, at step S701, at the same time as the connection support server 001 receives the apparatus detection request multicasted from the communication apparatus 101 on the network of the server 001, the connection support server 001 may transmit the relay request for the apparatus detection request, to an arbitrary apparatus on a different network. Operations performed at the time will hereinafter be described with reference to FIG. 5.

Figure 5:
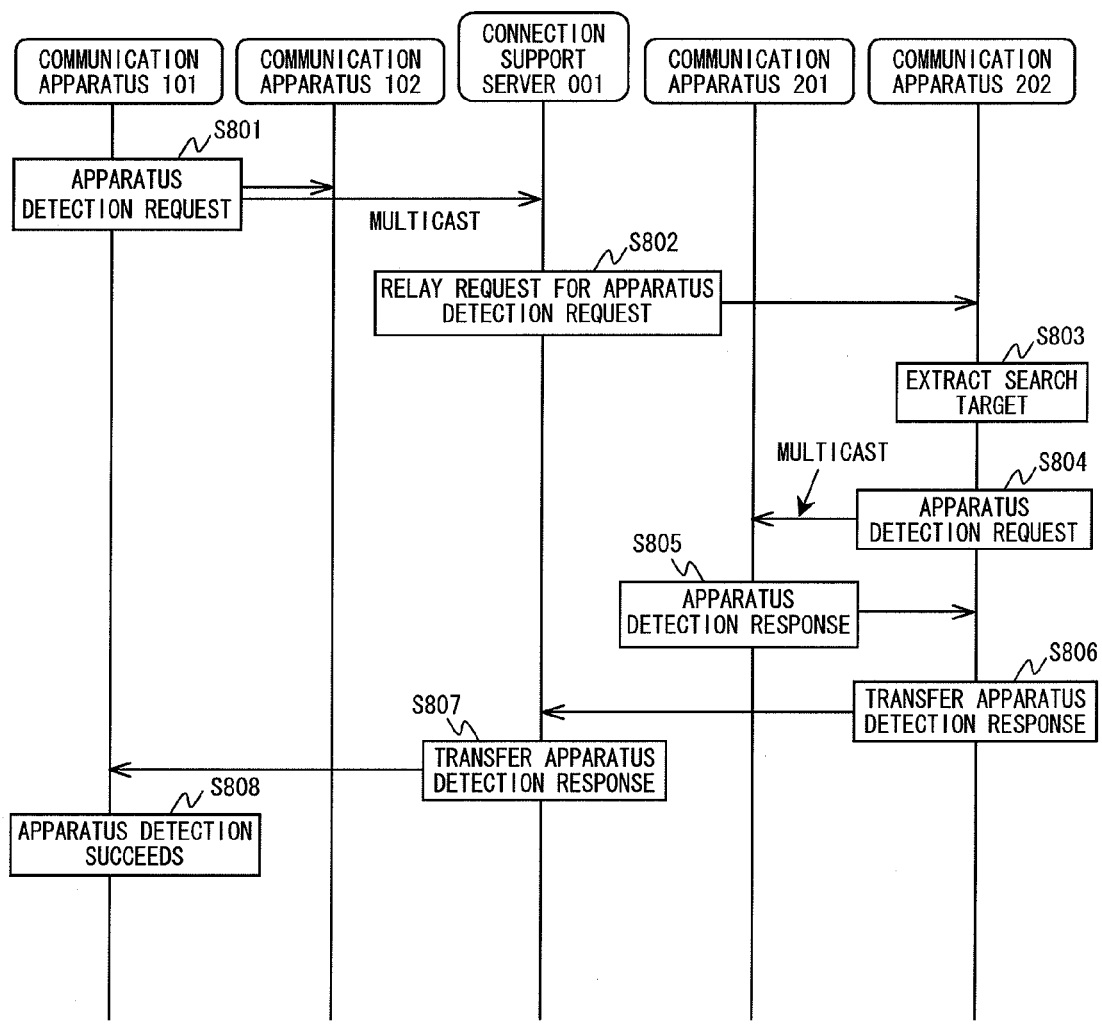
FIG. 5 shows a processing sequence, of the first embodiment of the present invention, in which the connection support server 001 transmits, at the same time as the connection support server 001 receives an apparatus detection request from the communication apparatus 101 on a network of the server 001, a relay request to an arbitrary communication apparatus on a different network.

As shown in FIG. 5, the apparatus detection request transmission section 1011 of the communication apparatus 101 multicasts via the communication section 1015, on the private network 01 to which the communication apparatus 101 is connected, an apparatus detection request designating the communication apparatus 201 as a search target (step S801). Here, since the communication apparatus 201 is not present on the private network 01 and the router 200 does not transfer the apparatus detection request to the private network 02, the apparatus detection response receiving section 1012 enters a state of waiting for an apparatus detection response to be received from the communication apparatus 201.

Here, when the relay request transfer section 0011 of the connection support server 001 receives, at step S801, the apparatus detection request multicasted by the communication apparatus present on the network of the connection support server 001, the relay request transfer section 0011 immediately selects, from the information stored in the communication path information storage section 0014, an arbitrary apparatus of each of all the networks other than the network of the connection support server 001 (here, only the private network 02) (in this case, the communication apparatus 202 is selected), with which arbitrary apparatus a connection is to be established, and then the relay request transfer section 0011 transmits, to the arbitrary apparatus via the communication section 0015, a relay request for the apparatus detection request (step S802).

Upon receiving the relay request from the connection support server 001, the relay request processing section 2024 of the communication apparatus 202 extracts the search target (communication apparatus 201) from the relay request for the apparatus detection request (step S803), and multicasts, on the private network 02, the apparatus detection request containing the extracted information, from the apparatus detection request transmission section 2021 via the communication section 2025 (step S804).

Upon receiving the apparatus detection request, the apparatus detection request receiving section 2011 of the communication apparatus 201 determines that the communication apparatus 201 is designated as the search target, and then transmits an apparatus detection response from the apparatus detection response transmission section 2012 to the relay request processing section 2024 of the communication apparatus 202 via the communication section 2013 (step S805).

Upon receiving the apparatus detection response, the relay request processing section 2024 transmits the response to the apparatus detection response transfer section 0012 of the connection support server 001 (step S806), and then the apparatus detection response transfer section 0012 transfers the apparatus detection response to the apparatus detection response receiving section 1012 of the communication apparatus 101 (step S807).

By receiving, from the connection support server 001, the apparatus detection response at the apparatus detection response receiving section 1012 which is in the state of waiting for the apparatus detection response to be received from the communication apparatus 201, the apparatus detection succeeds in detecting the communication apparatus 201 on the different private network (step S808).

As described above, at the same time as an apparatus on a network waits for a response to an apparatus detection request multicasted on the network, apparatus detection can be performed on a different network. This allows a time, which is consumed when an apparatus to detect is not present on the network, to be reduced.

Figure 6:
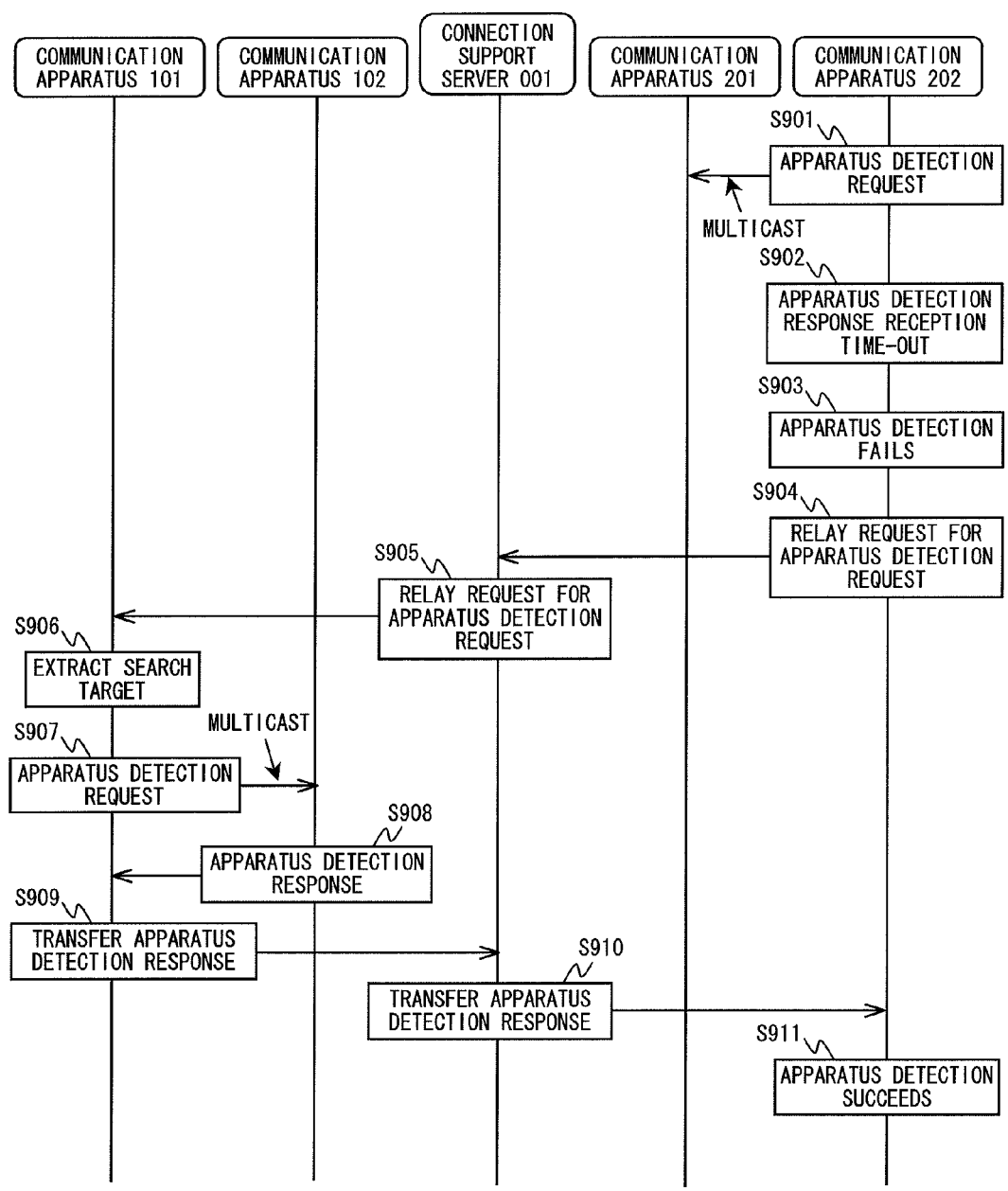
FIG. 6 shows a processing sequence, of the first embodiment of the present invention, for detecting the communication apparatus 102 connected to a superordinate network from the communication apparatus 202 connected to a subordinate network.

Described next with reference to FIG. 6 is a process in which the communication apparatus 202 on the private network 02 detects the communication apparatus 102 on the private network 01.

As shown in FIG. 6, the apparatus detection request transmission section 2021 of the communication apparatus 202 multicasts via the communication section 2025, on the private network 02 to which the communication apparatus 202 is connected, an apparatus detection request which designates the communication apparatus 102 as a search target (step S901). Here, since the communication apparatus 102 is not present on the private network 02 and the router 200 does not transfer the apparatus detection request to the private network 01, a reception time-out occurs in the apparatus detection response receiving section 2022 for an apparatus detection response to be received from the communication apparatus 102 (step S902). Thus, the apparatus detection fails (step S903).

When the apparatus detection fails on the network of the communication apparatus 202, the relay request transmission section 2023 of the communication apparatus 202 transmits via the communication section 2025 to the relay request transfer section 0011 of the connection support server 001, a request to relay the apparatus detection request (step S904).

When the relay request transfer section 0011 receives the relay request from the communication apparatus present on a different network, the relay request transfer section 0011 selects, from the information stored in the communication path information storage section 0014, an arbitrary apparatus of each of all the networks other than the private network 02 (here, only the private network 01) (in this case, the communication apparatus 101 is selected), with which arbitrary apparatus a connection is to be established. Then, the relay request transfer section 0011 transmits, to the arbitrary apparatus via the communication section 0015, the relay request for the apparatus detection request (step S905).

Upon receiving the relay request from the connection support server 001, the relay request processing section 1014 of the communication apparatus 101 extracts the search target (communication apparatus 102) from the relay request for the apparatus detection request (step S906), and multicasts, on the private network 01, the apparatus detection request containing the extracted information, from the apparatus detection request transmission section 1011 via the communication section 1015 (step S907).

Upon receiving the apparatus detection request, the apparatus detection request receiving section 1021 of the communication apparatus 102 determines that the communication apparatus 102 is designated as the search target, and then transmits an apparatus detection response from the apparatus detection response transmission section 1022 to the relay request processing section 1014 of the communication apparatus 101 via the communication section 1023 (step S908).

Upon receiving the apparatus detection response, the relay request processing section 1014 transmits the response to the apparatus detection response transfer section 0012 of the connection support server 001 (step S909), and then the apparatus detection response transfer section 0012 transfers the apparatus detection response to the apparatus detection response receiving section 2022 of the communication apparatus 202 (step S910).

By receiving the apparatus detection response at the apparatus detection response receiving section 2022 of the communication apparatus 202, the apparatus detection succeeds in detecting the communication apparatus 102 on the different private network (step S911).

Upon receiving, at step S904, the relay request for the apparatus detection request, the connection support server 001 may multicast the apparatus detection request on the network of the connection support server 001, instead of transferring the relay request to the arbitrary apparatus on the network. Operations performed at the time will be described with reference to FIG. 7.

Figure 7:
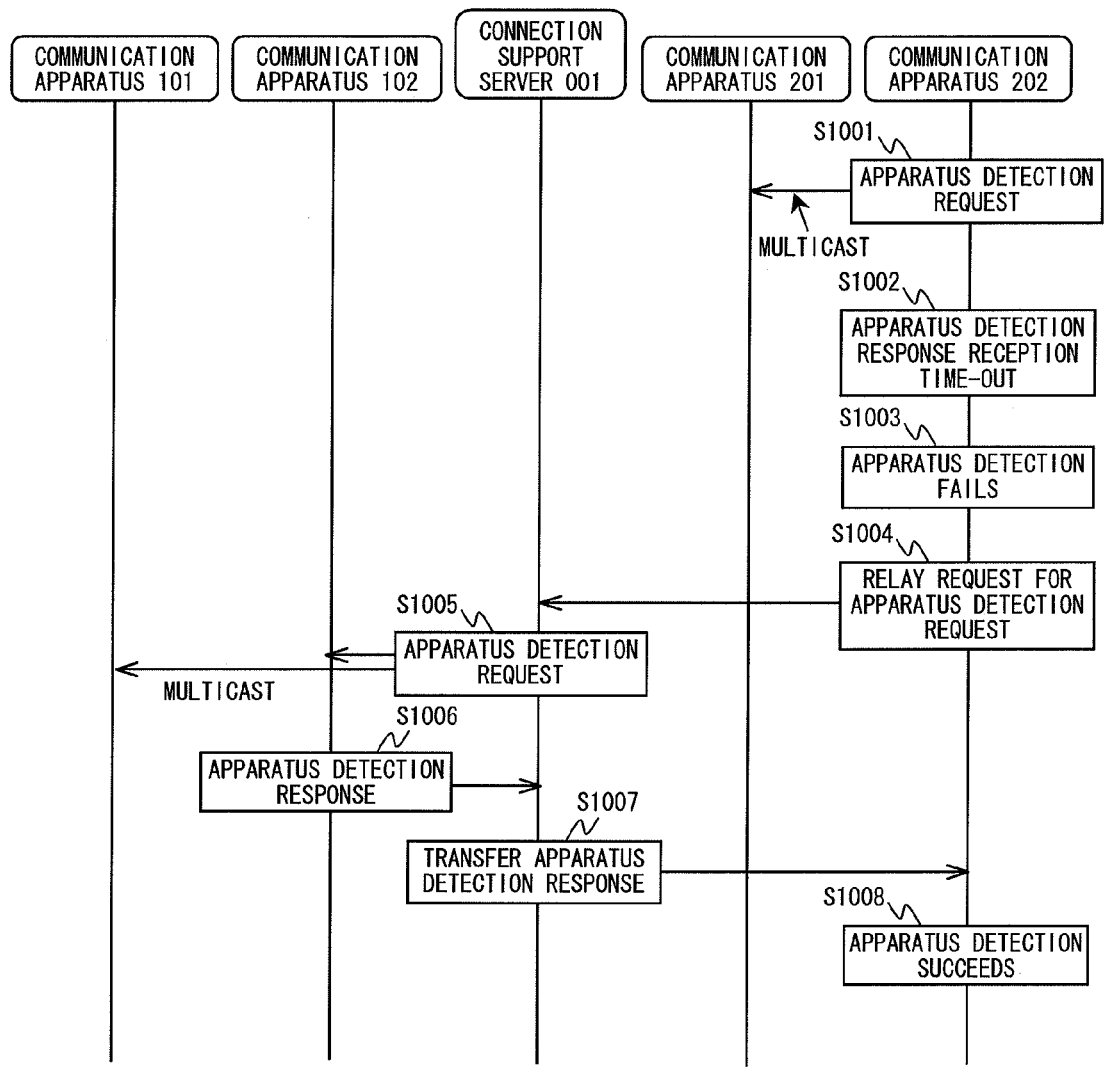
FIG. 7 shows a processing sequence, of the first embodiment of the present invention, in which the connection support server 001 multicasts, on a network thereof, an apparatus detection request to communication apparatuses at the same time as the connection support server 001 receives a relay request for an apparatus detection request from the communication apparatus 202 on a different network.

Processing performed at steps S1001 to S1004 in FIG. 7 is the same as that performed at steps S901 to S904 in FIG. 6.

Upon receiving the relay request for the apparatus detection request at step S1004, the relay request transfer section 0011 of the connection support server 001 multicasts, on the network of the connection support server 001 via the communication section 0015, the apparatus detection request for the apparatus which is the search target contained in the relay request (i.e., the communication apparatus 102) (step S1005).

Upon receiving the apparatus detection request, the apparatus detection request receiving section 1021 of the communication apparatus 102 determines that the communication apparatus 102 is designated as the search target, and then transmits, via the communication section 1023, an apparatus detection response from the apparatus detection response transmission section 1022 to the apparatus detection response transfer section 0012 of the connection support server 001 (step S1006).

Upon receiving the apparatus detection response, the apparatus detection response transfer section 0012 transmits, via the communication section 0015, the apparatus detection response to the apparatus detection response receiving section 2022 of the communication apparatus 202 which is a transmission source of the relay request (step S1007).

By receiving the apparatus detection response at the apparatus detection response receiving section 2022 of the communication apparatus 202, the apparatus detection succeeds in detecting the communication apparatus 102 on the different private network (step S1008).

As described above, the connection support server 001 multicasts the apparatus detection request on the network of the connection support server 001, instead of transferring the relay request to an arbitrary apparatus on the network. This omits the steps in which the apparatus detection request is relayed to the arbitrary apparatus on the network of the connection support server 001 and the arbitrary apparatus performs multicasting. Accordingly, a time consumed for the search can be reduced.

Note that, the relay request transfer section 0011 of the connection support server 001 which has received, from the communication apparatus on the different network at step S904 of FIG. 6, the relay request for the apparatus detection request, selects, from the information stored in the communication path information storage section 0014, an arbitrary apparatus of each of all the networks other than the private network 02 (here, only the private network 01) (in this case, the communication apparatus 101 is selected), with which arbitrary apparatus a connection is to be established. Then, the relay request transfer section 0011 transmits, to the arbitrary apparatus via the communication section 0015, the relay request for the apparatus detection request. Here, the relay request may be always transmitted to the same communication apparatus. For example, by always causing an apparatus having a high processing capability to multicast the apparatus detection request, such processing load can be prevented from being imposed on an apparatus having a low processing capability.

Further, the relay request transfer section 0011 of the connection support server 001 which has received, from the communication apparatus on the different network, the relay request for the apparatus detection request may transmit the relay request for the apparatus detection request, to a different communication apparatus each time the relay request transfer section 0011 transmits the relay request. As a result, the multicasting of the apparatus detection request can be performed in a dispersed manner, whereby stability of the network is obtained.

The communication apparatus, which has received the relay request at step S705 of FIG. 4, step S802 of FIG. 5 or step S905 of FIG. 6, may transmit, in consideration of processing load thereon, a relay rejection response from a relay rejection response transmission section (not shown) to the relay rejection response receiving section 0013 of the connection support server 001. The relay rejection response receiving section 0013, which has received the relay rejection response, retransmits the relay request to a communication apparatus which is stored in the communication path information storage section 0014 and which is different from the apparatus which is a transmission source of the relay rejection response. This prevents the apparatus from becoming incapable of performing processing due to performing the relay processing.

Used as a message of an apparatus detection request may be an M-SEARCH request stipulated by UPnP, or may be a message stipulated by a different protocol.

The transmission manner of the apparatus detection request is not limited to multicasting. The transmission manner may be broadcasting or any other manner of data transmission.

The configuration described in the present embodiment is merely an example, and the present embodiment is not limited thereto.

For example, in the case where the connection support server 001 is connected to the private network 02, the communication apparatus 201 can be detected from the communication apparatus 101, and also the communication apparatus 102 can be detected from the communication apparatus 202, by performing the same processing as described above.

It is assumed in the present embodiment that all the communication apparatuses each have a communication path established with the connection support server 001. However, the present embodiment is not limited thereto. As long as there is, on a private network, at least one communication apparatus which has a communication path established with the connection support server 001, even a communication apparatus which does not have a communication path established with the connection support server 001 can be detected by causing the at least one communication apparatus having the established communication path to perform the relaying in accordance with the processing sequence described in the present embodiment.

Second Embodiment

Hereinafter, a second embodiment of the present invention will be described with reference to the drawings.

Figure 8:
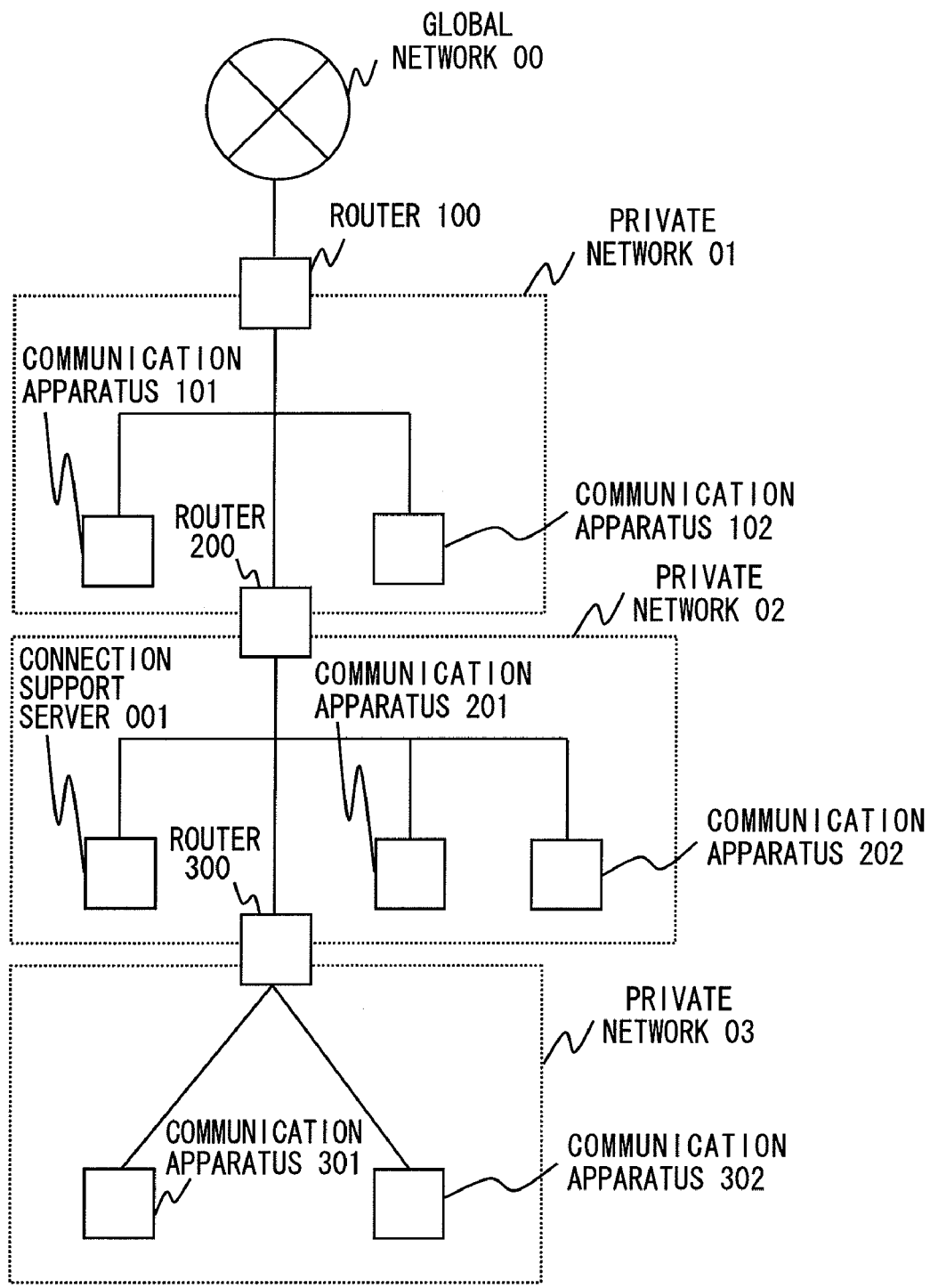
FIG. 8 shows an exemplary configuration of an entire system according to a second embodiment of the present invention.

FIG. 8 shows an exemplary configuration of an entire system according to the second embodiment of the present invention.

As shown in FIG. 8, the global network 00 and the private network 01 are connected via the router 100. The router 100 has the global IP address [IPW 100] as a WAN address and the private IP address [IPL 100] as a LAN address.

Also, the private network 01 and the private network 02 are connected via the router 200. The router 200 has the private IP address [IPW 200] as a WAN address and the private IP address [IPL 200] as a LAN address.

Further, the private network 02 and a private network 03 are connected via a router 300. The router 300 has a private IP address [IPW 300] as a WAN address and a private IP address [IPL 300] as a LAN address.

The communication apparatus 101 having the private IP address [IPL 101] and the communication apparatus 102 having the private IP address [IPL 102] are connected to the private network 01.

The communication apparatus 201 having the private IP address [IPL 201] and the communication apparatus 202 having the private IP address [IPL 202] are connected to the private network 02.

A communication apparatus 301 having a private IP address [IPL 301] and a communication apparatus 302 having a private IP address [IPL 302] are connected to the private network 03.

The connection support server 001 having the private IP address [IPL 001] is also connected to the private network 02. The connection support server 001 has established communication paths through which the connection support server 001 can interactively communicate with all the communication apparatuses connected to the private networks 01, 02 and 03.

Block diagrams showing the configurations of the connection support server 001 and the communication apparatuses 101, 102, 201 and 202 are the same as those described in the first embodiment.

Figure 9A:
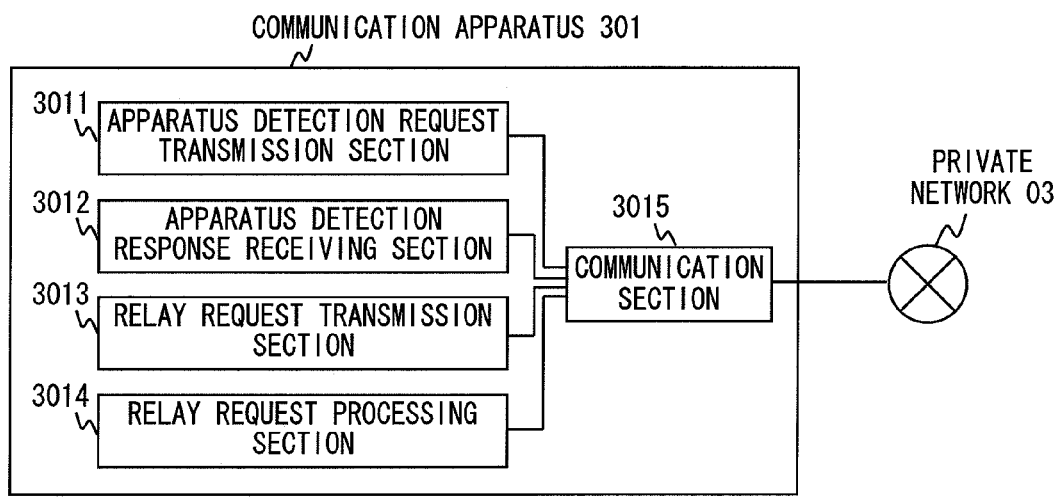
FIG. 9A is a block diagram showing an exemplary configuration of a communication apparatus 301 according to the second embodiment of the present invention.
Figure 9B:
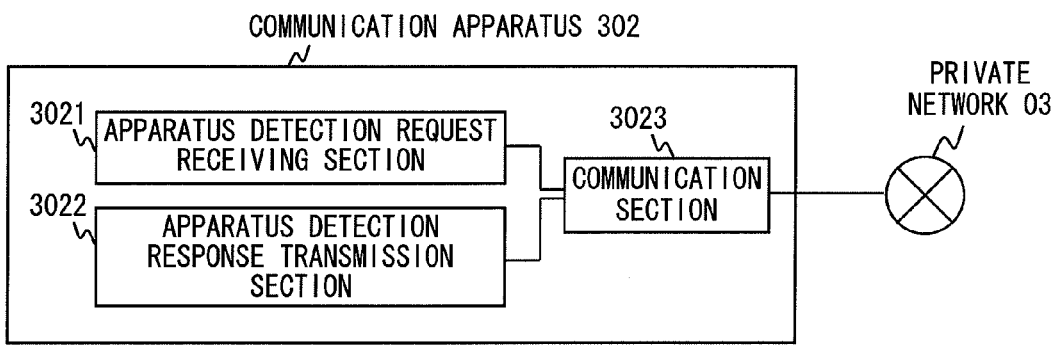
FIG. 9B is a block diagram showing an exemplary configuration of a communication apparatus 302 according to the second embodiment of the present invention.

FIG. 9A is a block diagram showing an exemplary configuration of the communication apparatus 301 according to the second embodiment of the present invention. FIG. 9B is a block diagram showing an exemplary configuration of the communication apparatus 302 according to the second embodiment of the present invention.

As shown in FIG. 9A, the communication apparatus 301 comprises: an apparatus detection request transmission section 3011 for multicasting, on a network thereof, an apparatus detection request for an apparatus which is desired to establish a communication with the communication apparatus 301; an apparatus detection response receiving section 3012 for receiving an apparatus detection response; a relay request transmission section 3013 for transmitting, to the connection support server 001, a request to relay the apparatus detection request; a relay request processing section 3014 for, when receiving from the connection support server 001 a request to relay an apparatus detection request, multicasting the apparatus detection request on the network of the communication apparatus 301; and a communication section 3015 for performing all the communications. The communication apparatus 301 is, for example, a PC or remote controller for operating another apparatus.

As shown in FIG. 9B, the communication apparatus 302 comprises: an apparatus detection request receiving section 3021 for receiving an apparatus detection request which is multicasted on a network thereof, and determining whether or not a search target contained in the received apparatus detection request is the communication apparatus 302; an apparatus detection response transmission section 3022 for transmitting an apparatus detection response when the search target is the communication apparatus 302; and a communication section 3023 for performing all the communications. The communication apparatus 302 is, for example, a television or VCR which is operated by another apparatus.

Described below in the present embodiment is an apparatus detection process which is performed in the case where the connection support server 001 is connected to the private network 02.

Figure 10:
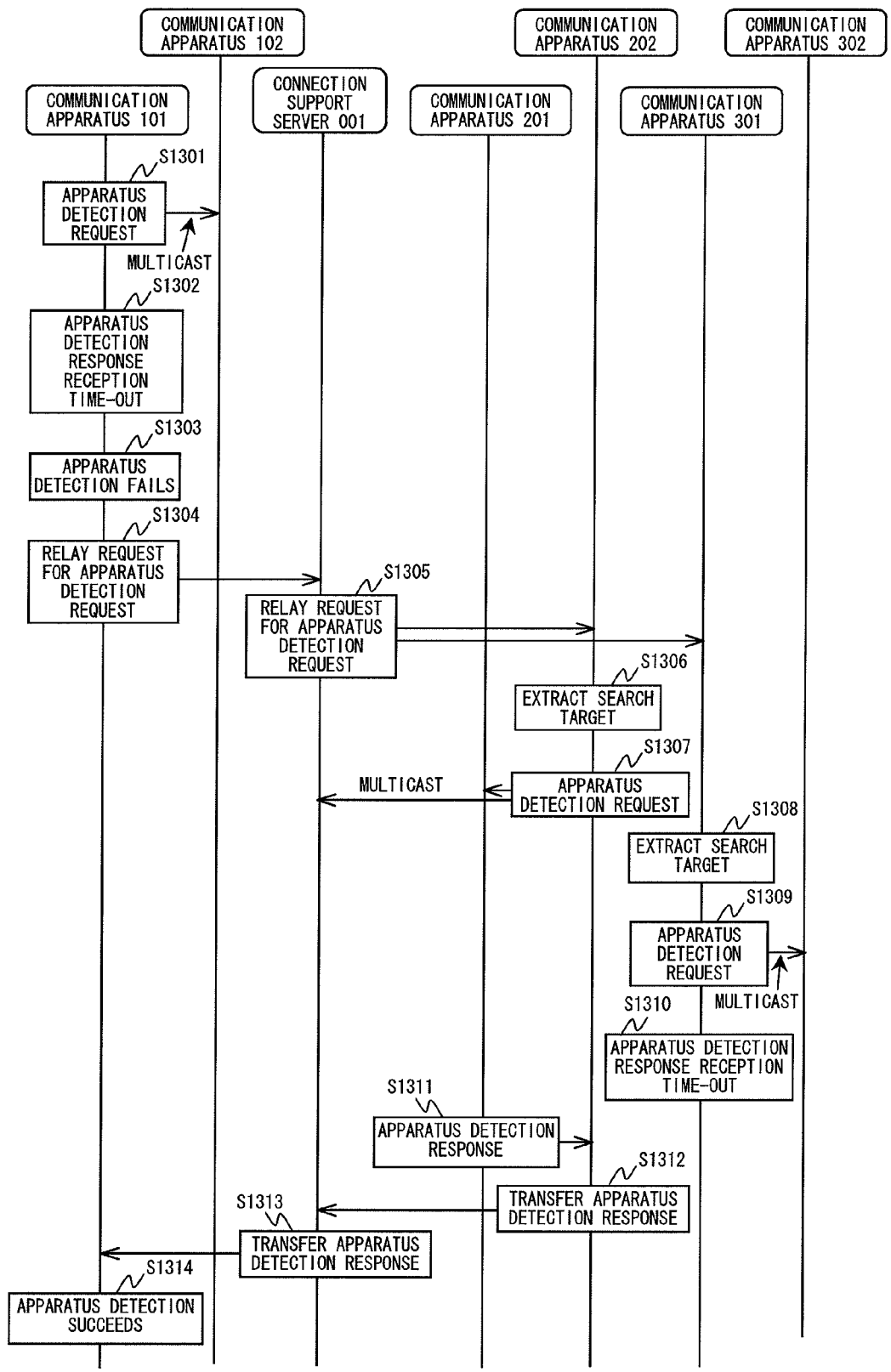
FIG. 10 shows a processing sequence, of the second embodiment of the present invention, for detecting the communication apparatus 201 connected to a subordinate network from the communication apparatus 101 connected to a superordinate network.

Described first with reference to FIG. 10 is a process in which the communication apparatus 101 on the private network 01 detects the communication apparatus 201 on the private network 02.

The apparatus detection request transmission section 1011 of the communication apparatus 101 multicasts via the communication section 1015, on the private network 01 to which the communication apparatus 101 is connected, an apparatus detection request which designates the communication apparatus 201 as a search target (step S1301). Here, since the communication apparatus 201 is not present on the private network 01 and the router 200 does not transfer the apparatus detection request to the private network 02, a reception time-out occurs in the apparatus detection response receiving section 1012 for an apparatus detection response to be received from the communication apparatus 201 (step S1302). Thus, the apparatus detection fails (step S1303).

When the apparatus detection fails on the network of the communication apparatus 101, the relay request transmission section 1013 of the communication apparatus 101 transmits, to the relay request transfer section 0011 of the connection support server 001 via the communication section 1015, a request to relay the apparatus detection request (step S1304).

When the relay request transfer section 0011 receives the relay request from the communication apparatus 101 present on a different network (private network 01), the relay request transfer section 0011 selects, from the information stored in the communication path information storage section 0014, an arbitrary apparatus of each of all the networks other than the private network 01 (here, the private network 02 and the private network 03) (in this case, the communication apparatus 202 and the communication apparatus 301 are selected), with which arbitrary apparatus a connection is to be established. Then, the relay request transfer section 0011 transmits, to the arbitrary apparatus via the communication section 0015, the relay request for the apparatus detection request (step S1305).

Upon receiving the relay request from the connection support server 001, the relay request processing section 2024 of the communication apparatus 202 extracts the search target (communication apparatus 201) from the relay request for the apparatus detection request (step S1306), and multicasts, on the private network 02, the apparatus detection request containing the extracted information, from the apparatus detection request transmission section 2021 via the communication section 2025 (step S1307).

Similarly, Upon receiving the relay request from the connection support server 001, the relay request processing section 3014 of the communication apparatus 301 extracts the search target (communication apparatus 201) from the relay request for the apparatus detection request (step S1308), and multicasts, on the private network 03, the apparatus detection request containing the extracted information, from the apparatus detection request transmission section 3011 via the communication section 3015 (step S1309).

Here, since the communication apparatus 201 is not present on the private network 03, and the router 300 does not transfer the apparatus detection request to the private network 02, a reception time-out occurs for an apparatus detection response to be received from the communication apparatus 201 (step S1310).

Upon receiving the apparatus detection request multicasted by the communication apparatus 202, the apparatus detection request receiving section 2011 of the communication apparatus 201 determines that the communication apparatus 201 is designated as the search target, and then transmits an apparatus detection response from the apparatus detection response transmission section 2012 to the relay request processing section 2024 of the communication apparatus 202 via the communication section 2013 (step S1311).

Upon receiving the apparatus detection response, the relay request processing section 2024 transmits the response to the apparatus detection response transfer section 0012 of the connection support server 001 (step S1312), and then the apparatus detection response transfer section 0012 transfers the apparatus detection response to the apparatus detection response receiving section 1012 of the communication apparatus 101 (step S1313).

By receiving the apparatus detection response at the apparatus detection response receiving section 1012 of the communication apparatus 101, the apparatus detection succeeds in detecting the communication apparatus 201 on the different private network (step S1314).

Here, at step S1301, at the same time as the communication apparatus 101 multicasts, on the network thereof, the apparatus detection request from the apparatus detection request transmission section 1011, the communication apparatus 101 may transmit, from the relay request transmission section 1013 to the relay request transfer section 0011 of the connection support server 001, the relay request for the apparatus detection request. Accordingly, when an apparatus to detect is not present on the network of the communication apparatus 101, the apparatus detection can be performed on different networks at the same time as the communication apparatus 101 waits for a response to be received. This allows a time, which is consumed until the apparatus is detected, to be reduced.

Upon receiving, at step S1304, the relay request for the apparatus detection request, the connection support server 001 may multicast the apparatus detection request on the network of the connection support server 001, instead of transferring the relay request to the arbitrary apparatus on the network. Since operations performed at the time are the same as the processing shown in FIG. 7 of the first embodiment, a description thereof will be omitted. In the above manner, the steps in which the apparatus detection request is relayed to the arbitrary apparatus on the network of the connection support server 001 and the apparatus performs multicasting, can be omitted. Accordingly, a time consumed for the search can be reduced.

Figure 11:
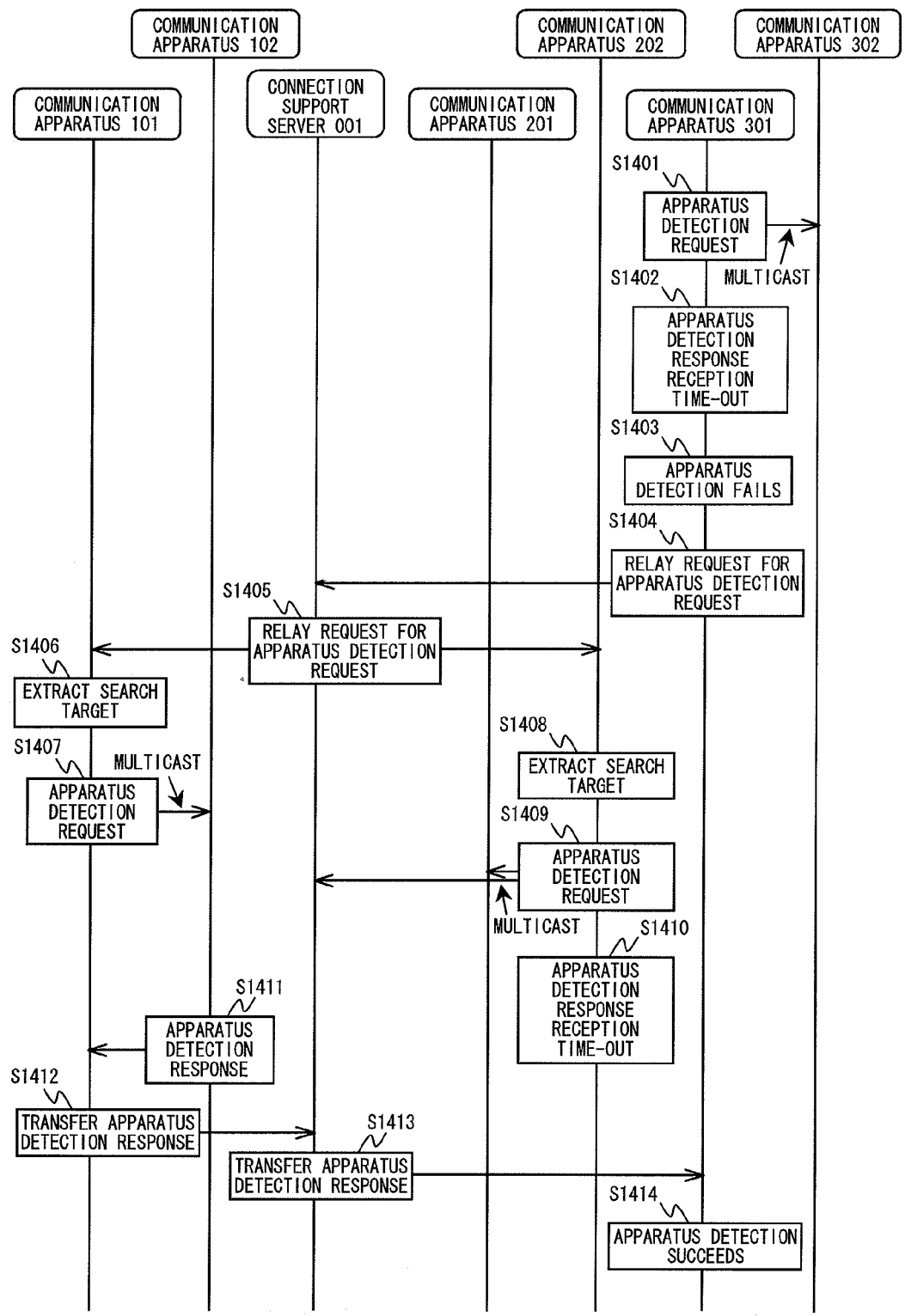
FIG. 11 shows a processing sequence, of the second embodiment of the present invention, for detecting the communication apparatus 102 connected to a superordinate network from the communication apparatus 301 connected to a subordinate network.

Described next with reference to FIG. 11 is a process in which the communication apparatus 301 on the private network 03 detects the communication apparatus 102 on the private network 01.

As shown in FIG. 11, the apparatus detection request transmission section 3011 of the communication apparatus 301 multicasts via the communication section 3015, on the private network 03 to which the communication apparatus 301 is connected, an apparatus detection request which designates the communication apparatus 102 as a search target (step S1401). Here, since the communication apparatus 102 is not present on the private network 03, and the router 200 does not transfer the apparatus detection request to the private network 02, a reception time-out occurs in the apparatus detection response receiving section 3012 for an apparatus detection response to be received from the communication apparatus 102 (step S1402). Thus, the apparatus detection fails (step S1403).

When the apparatus detection fails on the network of the communication apparatus 301, the relay request transmission section 3013 of the communication apparatus 301 transmits, to the relay request transfer section 0011 of the connection support server 001 via the communication section 3015, a request to relay the apparatus detection request (step S1404).

When the relay request transfer section 0011 receives the relay request from the communication apparatus 301 present on a different network (private network 03), the relay request transfer section 0011 selects, from the information stored in the communication path information storage section 0014, an arbitrary apparatus of each of all the networks other than the private network 03 (here, the private network 01 and the private network 02) (in this case, the communication apparatus 101 and the communication apparatus 202 are selected), with which arbitrary apparatus a connection is to be established. Then, the relay request transfer section 0011 transmits, to the arbitrary apparatus via the communication section 0015, the relay request for the apparatus detection request (step S1405).

Upon receiving the relay request from the connection support server 001, the relay request processing section 1014 of the communication apparatus 101 extracts the search target (communication apparatus 102) from the relay request for the apparatus detection request (step S1406), and multicasts, on the private network 01, the apparatus detection request containing the extracted information, from the apparatus detection request transmission section 1011 via the communication section 1015 (step S1407).

Similarly, Upon receiving the relay request from the connection support server 001, the relay request processing section 2024 of the communication apparatus 202 extracts the search target (communication apparatus 102) from the relay request for the apparatus detection request (step S1408), and multicasts, on the private network 02, the apparatus detection request containing the extracted information, from the apparatus detection request transmission section 2021 via the communication section 2025 (step S1409).

Here, since the communication apparatus 102 is not present on the private network 02 and the router 200 does not transfer the apparatus detection request to the private network 01, a reception time-out occurs for an apparatus detection response to be received from the communication apparatus 102 (step S1410).

Upon receiving the apparatus detection request multicasted by the communication apparatus 101, the apparatus detection request receiving section 1021 of the communication apparatus 102 determines that the communication apparatus 102 is designated as the search target, and then transmits an apparatus detection response from the apparatus detection response transmission section 1022 to the relay request processing section 1014 of the communication apparatus 101 via the communication section 1023 (step S1411).

Upon receiving the apparatus detection response, the relay request processing section 1014 transmits the response to the apparatus detection response transfer section 0012 of the connection support server 001 (step S1412), and then the apparatus detection response transfer section 0012 transfers the apparatus detection response to the apparatus detection response receiving section 3012 of the communication apparatus 301 (step S1413).

By receiving the apparatus detection response at the apparatus detection response receiving section 3012 of the communication apparatus 301, the apparatus detection succeeds in detecting the communication apparatus 102 on the different private network (step S1414).

Note that, when the relay request transfer section 0011 of the connection support server 001 receives, from the communication apparatus on the different network at step S1404 of FIG. 11, the relay request for the apparatus detection request, the relay request transfer section 0011 selects, from the information stored in the communication path information storage section 0014, an arbitrary apparatus of each of all the networks other than the private network 03 (here, the private network 01 and the private network 02) (in this case, the communication apparatus 101 and the communication apparatus 202 are selected), and then transmits, to the arbitrary apparatus via the communication section 0015, the relay request for the apparatus detection request. Here, the relay request may be always transmitted to the same communication apparatus. For example, by always causing an apparatus having a high processing capability to multicast the apparatus detection request, a time consumed for the search can be reduced.

Further, the relay request transfer section 0011 of the connection support server 001 which has received, from the communication apparatus on the different network, the relay request for the apparatus detection request may transmit the relay request to a different communication apparatus each time the relay request transfer section 0011 transmits the relay request. As a result, the multicasting of the apparatus detection request can be performed in a dispersed manner, whereby stability of the network is obtained.

The communication apparatuses having received the relay request at step S1305 of FIG. 10 or at step S1405 of FIG. 11 may each transmit, in consideration of processing load thereon, a relay rejection response from the relay rejection response transmission section (not shown) to the relay rejection response receiving section 0013 of the connection support server 001. The relay rejection response receiving section 0013, which has received the relay rejection response, retransmits the relay request to a communication apparatus which is stored in the communication path information storage section and which is different from the apparatus which is a transmission source of the relay rejection response. This makes it possible to, in the case where the apparatus which is requested to relay the apparatus detection request is unable to multicast the apparatus detection request due to a load imposed thereon, request a different apparatus, on which a processing load is not imposed, to relay the apparatus detection request. This prevents the apparatus from becoming incapable of performing processing.

Used as a message of an apparatus detection request may be an M-SEARCH request stipulated by UPnP, or may be a message stipulated by a different protocol.

The transmission manner of the apparatus detection request is not limited to multicasting. The transmission manner may be broadcasting or any other manner of data transmission.

The configuration described in the present embodiment is merely an example, and the present embodiment is not limited thereto.

For example, in the case where the connection support server 001 is connected to the private network 02, the communication apparatus 302 can be detected from the communication apparatus 101, and also the communication apparatus 102 or 302 can be detected from the communication apparatus 202, by performing the same processing as described above.

Further, in the case where the connection support server 001 is connected to the private network 01, an apparatus on the private network 02 or 03 can be detected from an apparatus on the private network 01; an apparatus on the private network 01 or 03 can be detected from an apparatus on the private network 02; and an apparatus on the private network 01 or 02 can be detected from an apparatus on the private network 03.

It is assumed in the present embodiment that all the communication apparatuses each have an established communication path with the connection support server 001. However, the present embodiment is not limited thereto. As long as there is, on a private network, at least one communication apparatus which has an established communication path with the connection support server 001, even a communication apparatus which does not have an established communication path with the connection support server 001 can be detected by causing the at least one communication apparatus having the established communication path to perform the relaying in accordance with the processing sequence described in the present embodiment.

Third Embodiment

Hereinafter, a third embodiment of the present invention will be described with reference to the drawings.

FIG. 12 shows an exemplary configuration of an entire system according to the third embodiment of the present invention.

As shown in FIG. 12, the global network 00 and the private network 01 are connected via the router 100. The router 100 has the global IP address [IPW 100] as a WAN address and the private IP address [IPL 100] as a LAN address.

Also, the private network 01 and the private network 02 are connected via the router 200. The router 200 has the private IP address [IPW 200] as a WAN address and the private IP address [IPL 200] as a LAN address.

Further, the private network 01 and the private network 03 are connected via the router 300. The router 300 has the private IP address [IPW 300] as a WAN address and the private IP address [IPL 300] as a LAN address.

The communication apparatus 201 having the private IP address [IPL 201] and the communication apparatus 202 having the private IP address [IPL 202] are connected to the private network 02.

The communication apparatus 301 having the private IP address [IPL 301] and the communication apparatus 302 having the private IP address [IPL 302] are connected to the private network 03.

The connection support server 001 having the private IP address [IPL 001] is also connected to the private network 01. The connection support server 001 has established communication paths through which the connection support server 001 can interactively communicate with all the communication apparatuses connected to the private networks 02 and 03.

Block diagrams showing the configurations of the connection support server 001 and the communication apparatuses 201, 202, 301 and 302 are the same as those described in the first and second embodiments.

Described below in the present embodiment is an apparatus detection process which is performed in the case where the connection support server 001 is connected to the private network 01.

Figure 13:
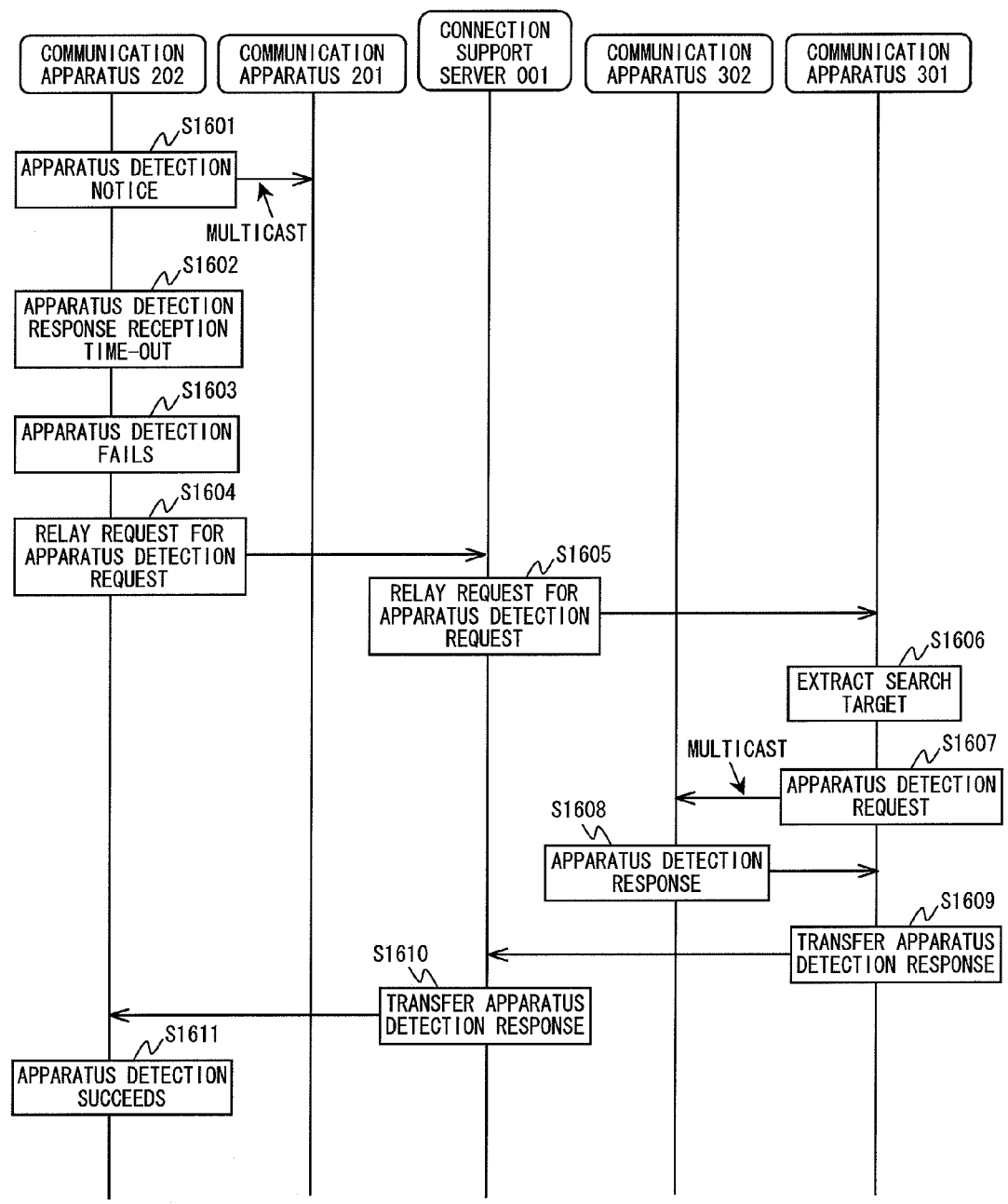
FIG. 13 shows a processing sequence, of the third embodiment of the present invention, for detecting, from the communication apparatus 202 connected to a subordinate network, the communication apparatus 302 connected to a different subordinate network.

Described first with reference to FIG. 13 is a process in which the communication apparatus 202 on the private network 02 detects the communication apparatus 302 on the private network 03.

As shown in FIG. 13, the apparatus detection request transmission section 2021 of the communication apparatus 202 multicasts via the communication section 2025, on the private network 02 to which the communication apparatus 202 is connected, an apparatus detection request which designates the communication apparatus 302 as a search target (step S1601). Here, since the communication apparatus 302 is not present on the private network 02 and the router 200 does not transfer the apparatus detection request to the private network 01, a reception time-out occurs in the apparatus detection response receiving section 2022 for an apparatus detection response to be received from the communication apparatus 302 (step S1602). Thus, the apparatus detection fails (step S1603).

When the apparatus detection fails on the network of the communication apparatus 202, the relay request transmission section 2023 of the communication apparatus 202 transmits, to the relay request transfer section 0011 of the connection support server 001 via the communication section 2025, a request to relay the apparatus detection request (step S1604).

When the relay request transfer section 0011 receives the relay request from the communication apparatus present on a different network (private network 02), the relay request transfer section 0011 selects, from the information stored in the communication path information storage section 0014, an arbitrary apparatus of each of all the networks other than the private network 02 (here, the private network 01 and the private network 03) (in this case, only the communication apparatus 301 is selected since there is no communication apparatus present on the private network 01), with which arbitrary apparatus a connection is to be established. Then, the relay request transfer section 0011 transmits, to the arbitrary apparatus via the communication section 0015, the relay request for the apparatus detection request (step S1605).

Upon receiving the relay request from the connection support server 001, the relay request processing section 3014 of the communication apparatus 301 extracts the search target (communication apparatus 302) from the relay request for the apparatus detection request (step S1606), and multicasts, on the private network 03, the apparatus detection request containing the extracted information, from the apparatus detection request transmission section 3011 via the communication section 3015 (step S1607).

Upon receiving the apparatus detection request, the apparatus detection request receiving section 3021 of the communication apparatus 302 determines that the communication apparatus 302 is designated as the search target, and then transmits an apparatus detection response from the apparatus detection response transmission section 3022 to the relay request processing section 3014 of the communication apparatus 301 via the communication section 3023 (step S1608).

Upon receiving the apparatus detection response, the relay request processing section 3014 transmits the response to the apparatus detection response transfer section 0012 of the connection support server 001 (step S1609), and then the apparatus detection response transfer section 0012 transfers the apparatus detection response to the apparatus detection response receiving section 2022 of the communication apparatus 202 (step S1610).

By receiving the apparatus detection response at the apparatus detection response receiving section 2022 of the communication apparatus 202, the apparatus detection succeeds in detecting the communication apparatus 302 on the different private network (step S1611).

Here, at step S1601, at the same time as the communication apparatus 202 multicasts, on the network thereof, the apparatus detection request from the apparatus detection request transmission section 2021, the communication apparatus 202 may transmit, from the relay request transmission section 2023 to the relay request transfer section 0011 of the connection support server 001, the relay request for the apparatus detection request. Accordingly, when an apparatus to detect is not present on the network of the communication apparatus 202, the apparatus detection can be performed on a different network at the same time as the communication apparatus 202 waits for a response to be received. This allows a time, which is consumed until the apparatus is detected, to be reduced.

Used as a message of an apparatus detection request may be an M-SEARCH request stipulated by UPnP, or may be a message stipulated by a different protocol.

The transmission manner of the apparatus detection request is not limited to multicasting. The transmission manner may be broadcasting or any other manner of data transmission.

The configuration described in the present embodiment is merely an example, and the present embodiment is not limited thereto.

For example, in the case where the connection support server 001 is connected to the private network 02, an apparatus on the private network 03 can be detected from an apparatus on the private network 02 by performing the same processing as described above. Also, an apparatus on the private network 02 can be detected from an apparatus on the private network 03.

The same is true in the case where the connection support server is connected to the private network 03.

It is assumed in the present embodiment that all the communication apparatuses each have an established communication path with the connection support server 001. However, the present embodiment is not limited thereto. As long as there is, on a private network, at least one communication apparatus which has an established communication path with the connection support server 001, even a communication apparatus which does not have an established communication path with the connection support server 001 can be detected by causing the at least one communication apparatus having the established communication path to perform the relaying in accordance with the processing sequence described in the present embodiment.

Fourth Embodiment

Hereinafter, a fourth embodiment of the present invention will be described with reference to the drawings.

Figure 14:
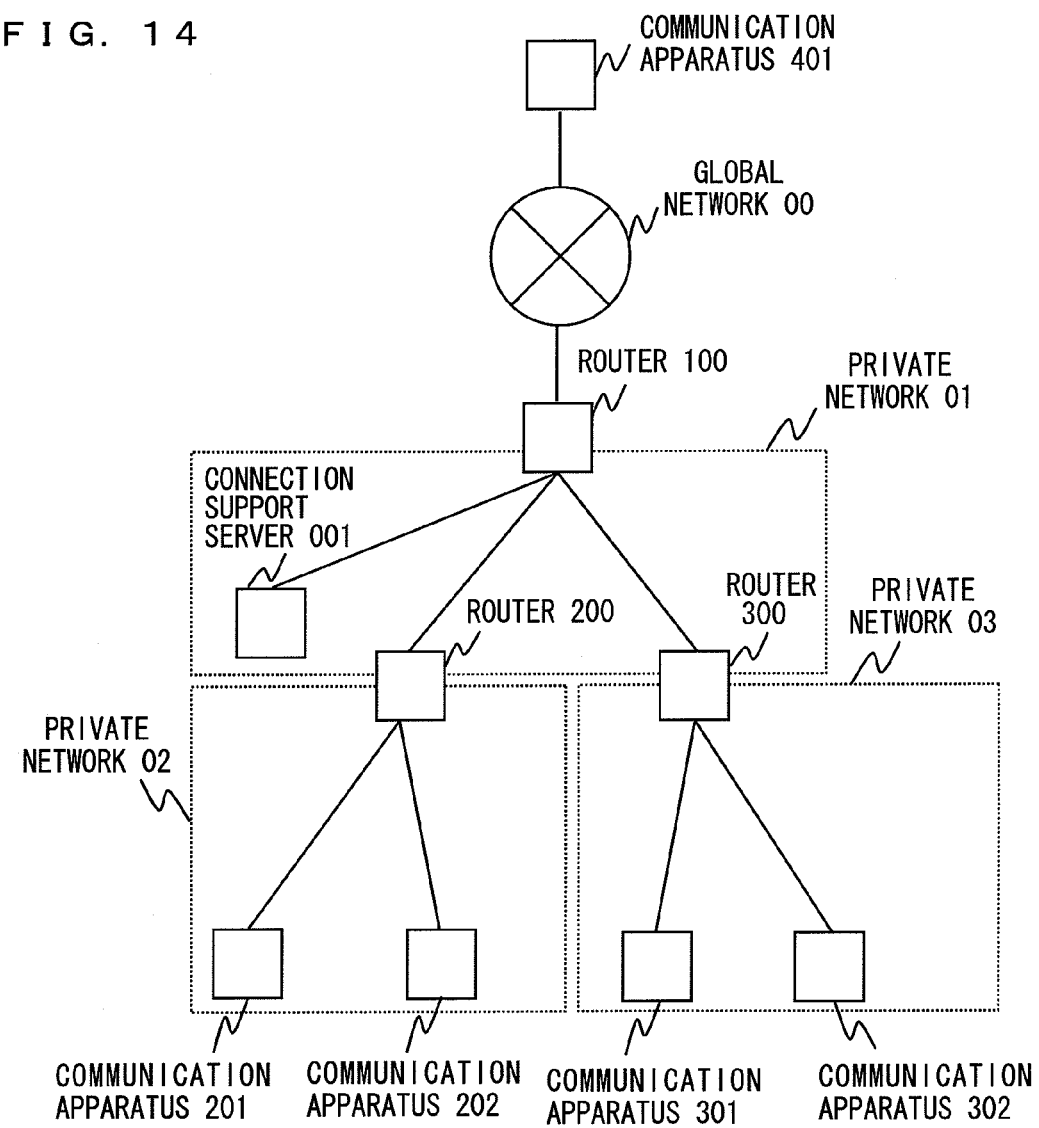
FIG. 14 shows an exemplary configuration of an entire system according to a fourth embodiment of the present invention.

FIG. 14 shows an exemplary configuration of an entire system according to the fourth embodiment of the present invention. As shown in FIG. 14, the global network 00 and the private network 01 are connected via the router 100. The router 100 has the global IP address [IPW 100] as a WAN address and the private IP address [IPL 100] as a LAN address.

Also, the private network 01 and the private network 02 are connected via the router 200. The router 200 has the private IP address [IPW 200] as a WAN address and the private IP address [IPL 200] as a LAN address.

Further, the private network 01 and the private network 03 are connected via the router 300. The router 300 has the private IP address [IPW 300] as a WAN address and the private IP address [IPL 300] as a LAN address.

A communication apparatus 401 having a global IP address [IPW 401] is connected to the global network 00.

The communication apparatus 201 having the private IP address [IPL 201] and the communication apparatus 202 having the private IP address [IPL 202] are connected to the private network 02.

The communication apparatus 301 having the private IP address [IPL 301] and the communication apparatus 302 having the private IP address [IPL 302] are connected to the private network 03.

The connection support server 001 having the private IP address [IPL 001] is also connected to the private network 01. The connection support server 001 has established communication paths through which the connection support server 001 can interactively communicate with all the communication apparatuses connected to the global network 00, the private network 02 and the private network 03.

Block diagrams showing the configurations of the connection support server 001 and the communication apparatuses 201, 202, 301 and 302 are the same as those described in the first and second embodiments.

Figure 15:
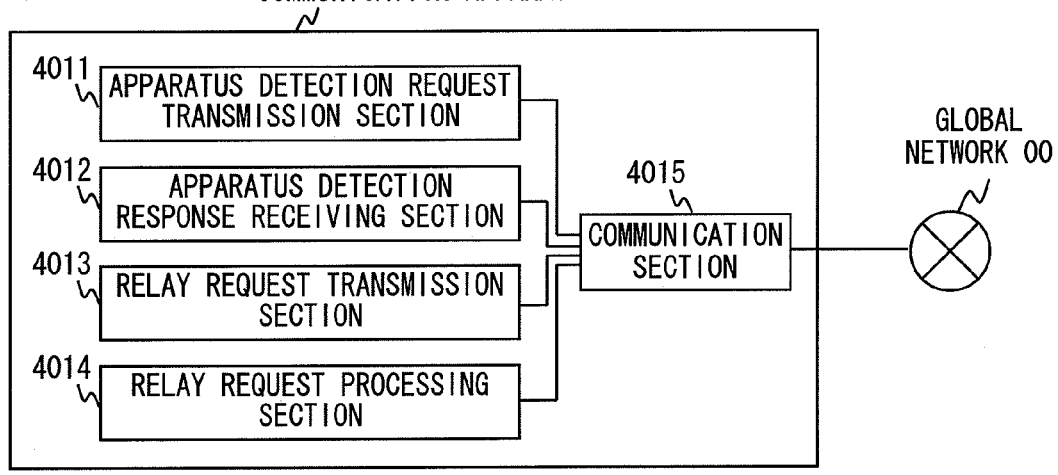
FIG. 15 is a block diagram showing an exemplary configuration of a communication apparatus 401 according to the fourth embodiment of the present invention.

FIG. 15 is a block diagram showing an exemplary configuration of the communication apparatus 401 according to the fourth embodiment of the present invention. As shown in FIG. 15 the communication apparatus 401 comprises: an apparatus detection request transmission section 4011 for multicasting, on a network thereof, an apparatus detection request for an apparatus which is desired to establish a communication with the communication apparatus 401; an apparatus detection response receiving section 4012 for receiving an apparatus detection response; a relay request transmission section 4013 for transmitting, to the connection support server, a request to relay the apparatus detection request; a relay request processing section 4014 for, when receiving from the connection support server 001 a request to relay an apparatus detection request, multicasting the apparatus detection request on the network of the communication apparatus 401; and a communication section 4015 for performing all the communications. The communication apparatus 401 is, for example, a mobile terminal having communication functions such as a mobile phone or PDA which is for operating another apparatus.

Since the communication apparatus 401 having the global IP address is unable to perform a request transmission by multicasting on the global network, the communication apparatus 401 may not necessarily have the apparatus detection request transmission section 4011 and the relay request processing section 4014.

Described below in the present embodiment is an apparatus detection process which is performed in the case where the connection support server 001 is connected to the private network 01.

Figure 16:
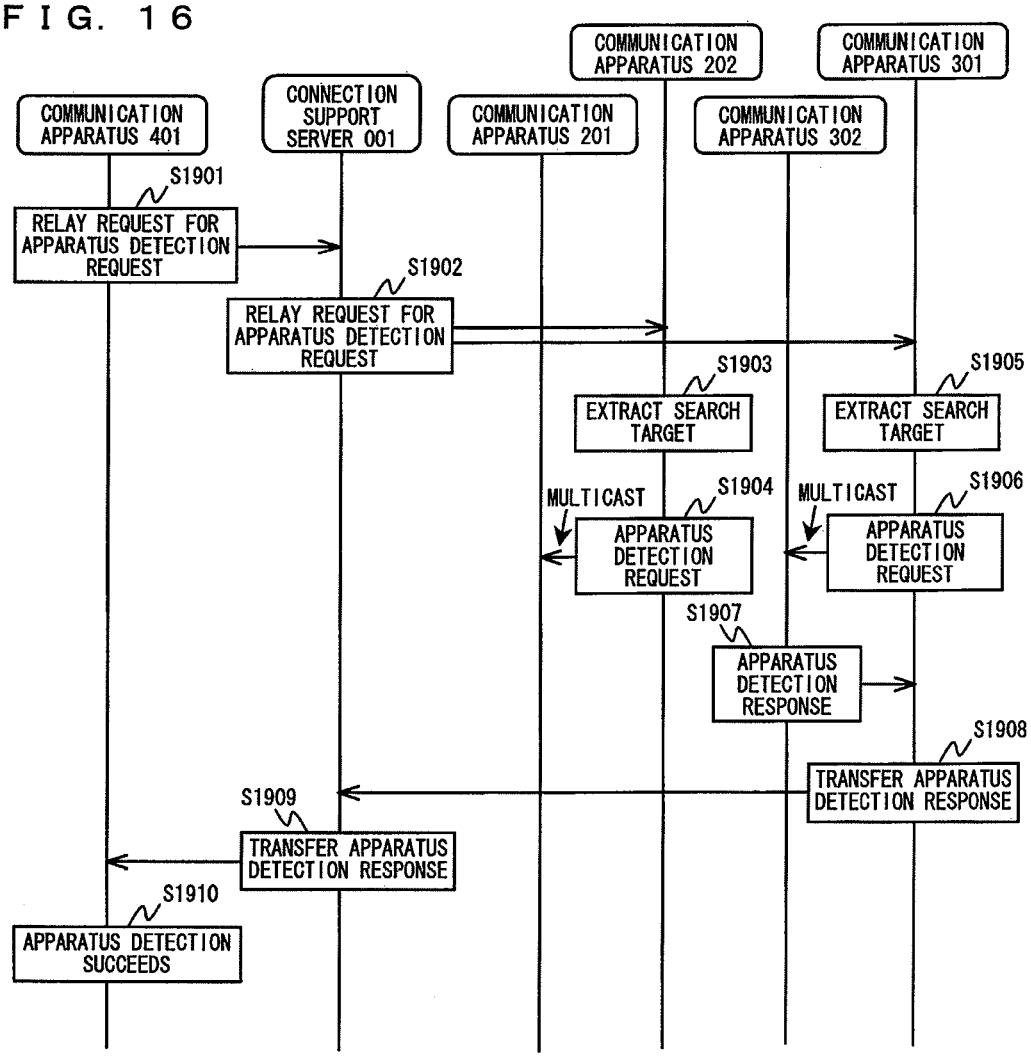
FIG. 16 shows a processing sequence, of the fourth embodiment of the present invention, for detecting the communication apparatus 302 connected to a private network from the communication apparatus 401 connected to a global network.
Figure 17A:
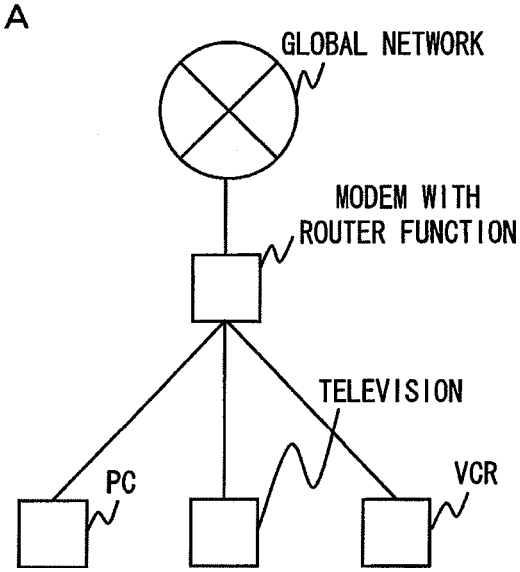
FIG. 17A shows a home network comprising conventional UPnP apparatuses.
Figure 17B:
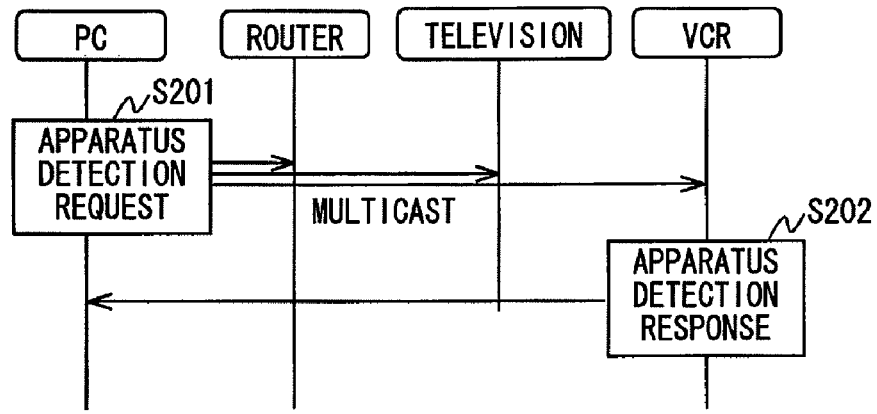
FIG. 17B shows a process for detecting an UPnP apparatus in a conventional home network.
Figure 18A:
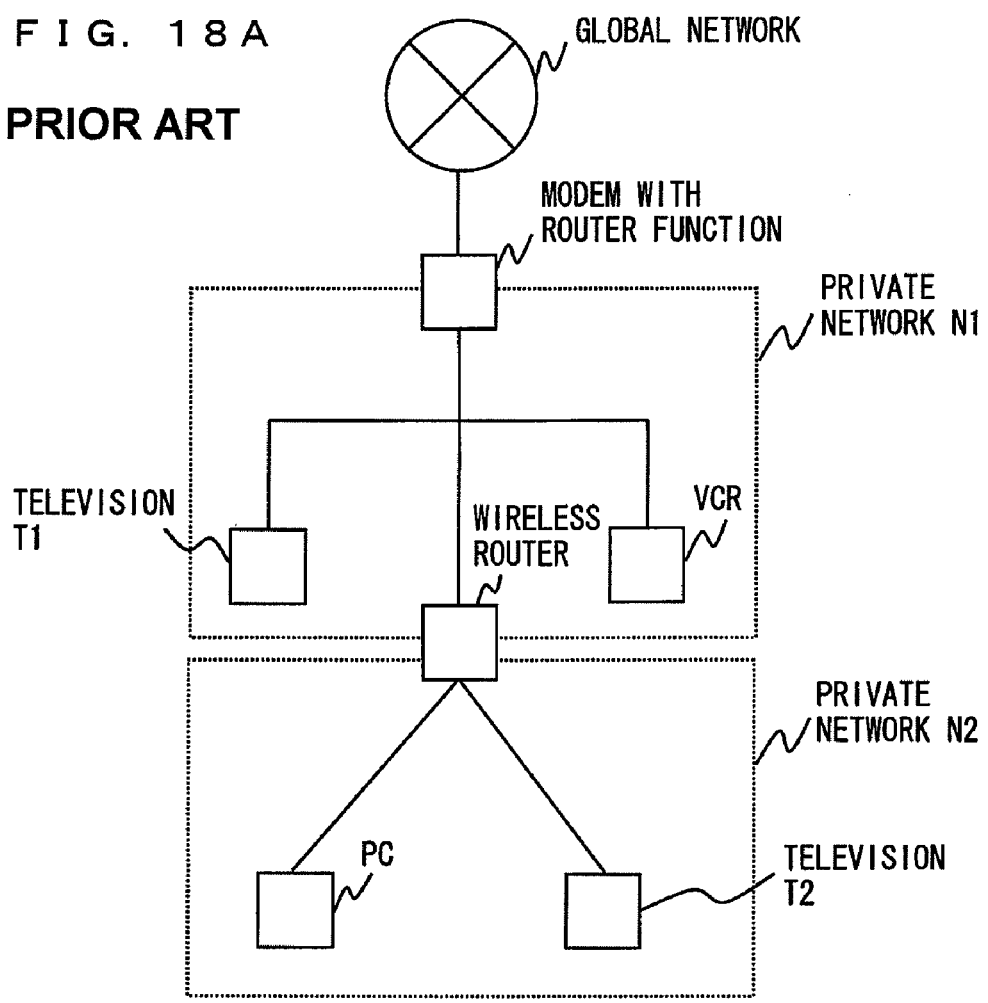
FIG. 18 shows a conventional router multistage home network.
FIG. 18B shows a process for detecting an UPnP apparatus in a conventional home network.
Figure 18B:
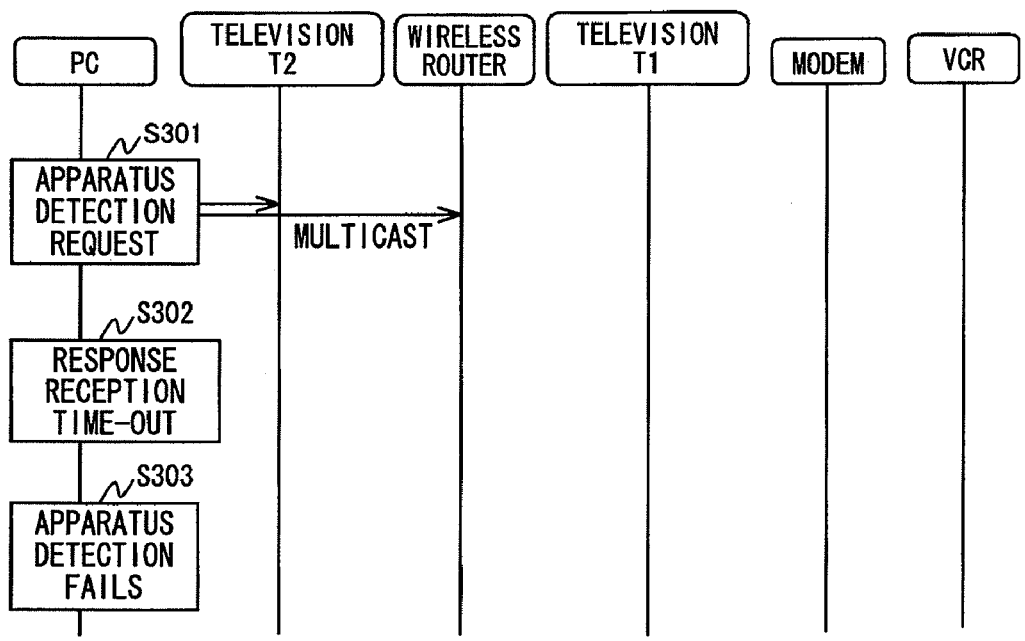
Figure 19A:
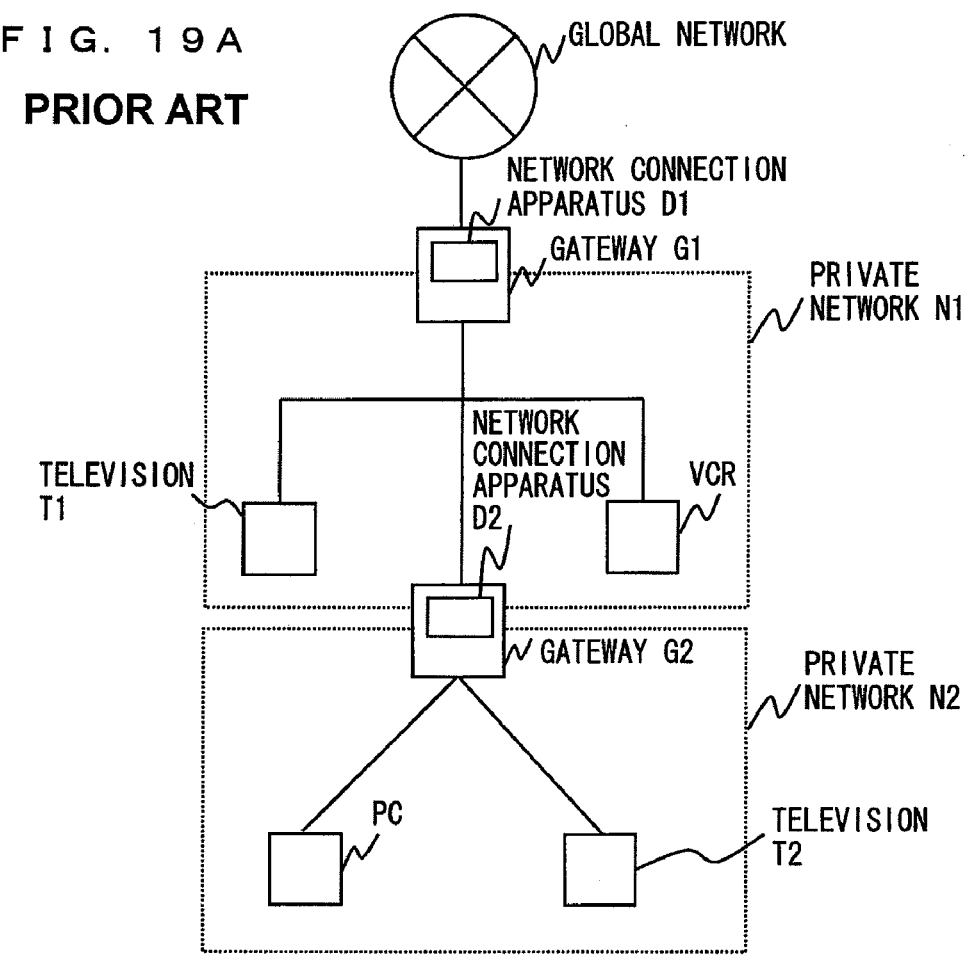
FIG. 19A shows a router multistage home network in which gateways each including a network connection apparatus of Patent Document 1 are provided.
Figure 19B:
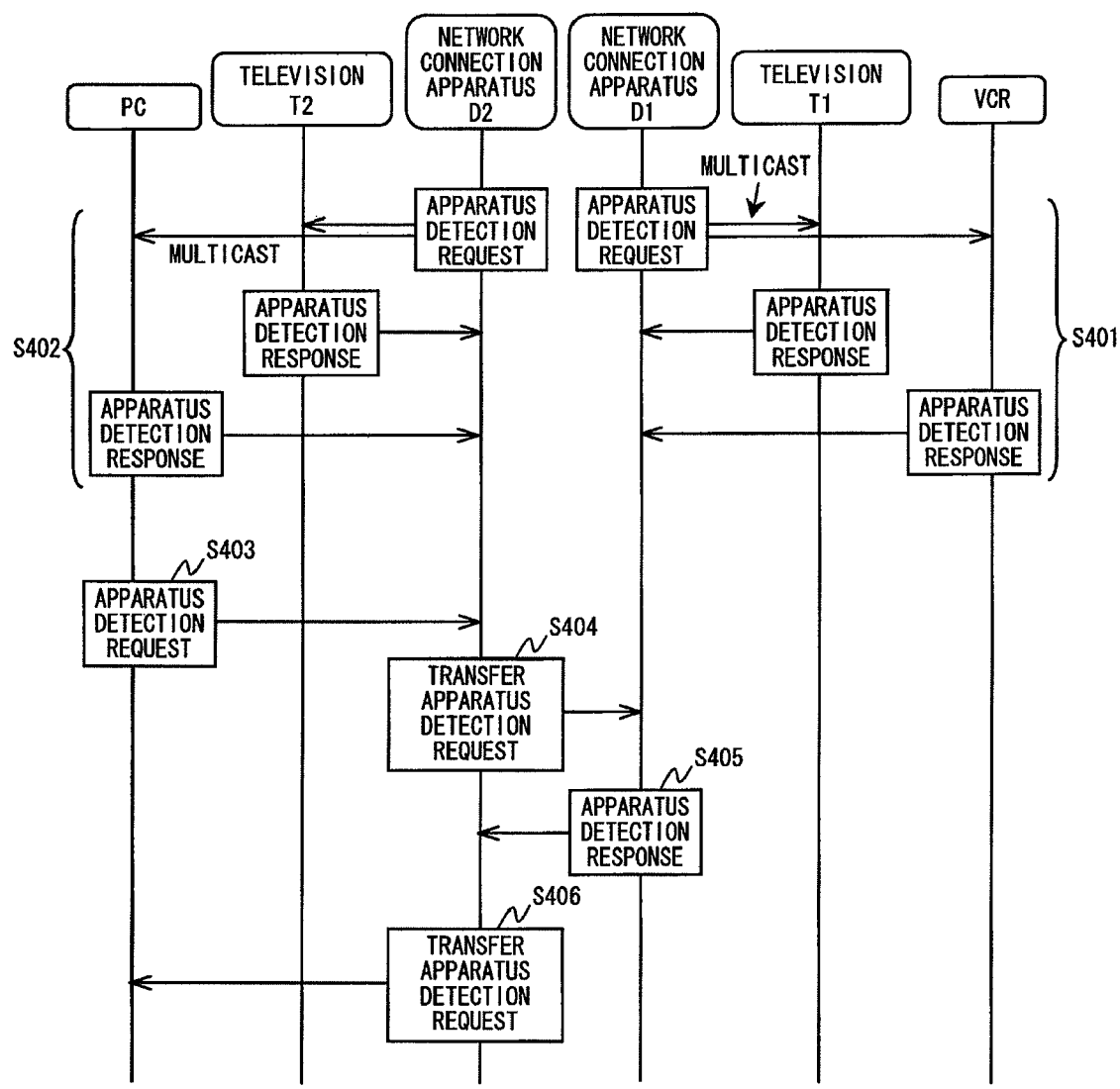
FIG. 19B shows a processing sequence for performing an apparatus detection by using a network connection apparatus and method of Patent Document 1.

Described first with reference to FIG. 16 is a process in which the communication apparatus 401 on the global network 00 detects the communication apparatus 302 on the private network 03.

Since the network to which the communication apparatus 401 is connected is a global network, the communication apparatus 401 does not multicast an apparatus detection request, and the relay request transmission section 4013 of the communication apparatus 401 transmits, to the relay request transfer section 0011 of the connection support server 001 via the communication section 4015, a relay request for an apparatus detection request (step S1901).

When the relay request transfer section 0011 receives the relay request from the communication apparatus present on a different network (global network 00), the relay request transfer section 0011 selects, from the information stored in the communication path information storage section 0014, an arbitrary apparatus of each of all the networks other than the global network 00 (here, the private networks 01, 02 and 03) (in this case, the communication apparatuses 201 and 301 are selected since there is no communication apparatus on the private network 01), with which arbitrary apparatus a connection is to be established. Then, the relay request transfer section 0011 transmits, to the arbitrary apparatus via the communication section 0015, the relay request for the apparatus detection request (step S1902).

Upon receiving the relay request from the connection support server 001, the relay request processing section 2024 of the communication apparatus 202 extracts the search target (communication apparatus 302) from the relay request for the apparatus detection request (step S1903), and multicasts, on the private network 02, the apparatus detection request containing the extracted information, from the apparatus detection request transmission section 2021 via the communication section 2025 (step S1904).

Since the communication apparatus 201 having received the apparatus detection request is not designated as the search target, the apparatus detection request receiving section 2011 of the communication apparatus 201 does not transmit an apparatus detection response.

Upon receiving the relay request from the connection support server 001, the relay request processing section 3014 of the communication apparatus 301 extracts the search target (communication apparatus 302) from the relay request for the apparatus detection request (step S1905), and multicasts, on the private network 03, the apparatus detection request containing the extracted information, from the apparatus detection request transmission section 3011 via the communication section 3015 (step S1906).

Upon receiving the apparatus detection request, the apparatus detection request receiving section 3021 of the communication apparatus 302 determines that the communication apparatus 302 is designated as the search target, and then transmits an apparatus detection response from the apparatus detection response transmission section 3022 to the relay request processing section 3014 of the communication apparatus 301 via the communication section 3023 (step S1907).

Upon receiving the apparatus detection response, the relay request processing section 3014 transmits the response to the apparatus detection response transfer section 0012 of the connection support server 001 (step S1908), and then the apparatus detection response transfer section 0012 transfers the apparatus detection response to the apparatus detection response receiving section 4012 of the communication apparatus 401 (step S1909).

By receiving the apparatus detection response at the apparatus detection response receiving section 4012 of the communication apparatus 401, the apparatus detection succeeds in detecting the communication apparatus 302 on the different private network (step S1910).

Used as a message of an apparatus detection request may be an M-SEARCH request stipulated by UPnP, or may be a message stipulated by a different protocol.

The transmission manner of the apparatus detection request is not limited to multicasting. The transmission manner may be broadcasting or any other manner of data transmission.

The configuration described in the present embodiment is merely an example, and the present embodiment is not limited thereto.

For example, in the case where the connection support server 001 is connected to the private network 02, an apparatus on the private network 02 or 03 can be detected from an apparatus on the global network 00 by performing the same processing as described above. Also, an apparatus on the global network 00 can be detected from an apparatus on the private network 02 or 03.

The same is true in the case where the connection support server is connected to the private network 03.

Further, in the present embodiment, the communication apparatus 401 on the global network 00 has a global IP address and is directly connected to the global network 00. However, even in the case where the communication apparatus 401 is connected to a relay device having a global IP address such as a router and has a private IP address, the apparatus detection can be performed in the same manner.

It is assumed in the present embodiment that all the communication apparatuses each have an established communication path with the connection support server 001. However, the present embodiment is not limited thereto. By causing a communication apparatus having an established communication path with the connection support server 001 to perform the relaying in accordance with the processing sequence described in the present embodiment, even a communication apparatus, which is connected to a same network as that of the communication apparatus and which does not have an established communication path with the connection support server 001, can be detected.

INDUSTRIAL APPLICABILITY

The communication apparatus of the present invention is useful for, e.g., detecting an apparatus present on a different network in, e.g., a router multistage network comprising a plurality of routers.

The invention claimed is:

1. A communication apparatus having a connection support server function, which is, in a network including a plurality of subnetworks connected via a plurality of network address translation (NAT) devices, connected to an arbitrary subnetwork in the network and which has an established communication path with another communication apparatus connected to a different subnetwork that is different from the arbitrary subnetwork to which the communication apparatus having the connection support server function is connected, the communication apparatus having the connection support server function comprising processor including:
 a relay request transfer section for, when receiving from an arbitrary communication apparatus a relay request for an apparatus detection request, transferring to the another communication apparatus the relay request for the apparatus detection request; and
 an apparatus detection response transfer section for, when receiving an apparatus detection response, transferring the received apparatus detection response to the arbitrary communication apparatus which is a transmission source of the relay request for the apparatus detection request, wherein when receiving the relay request for the apparatus detection request, the relay request transfer section transfers the relay request for the apparatus detection request, to the another communication apparatus connected to the different subnetwork that is different from a subnetwork to which the arbitrary communication apparatus which is the transmission source of the relay request for the apparatus detection request is connected, the apparatus detection response transfer section has the connection support server function for, when receiving the apparatus detection response from the another communication apparatus to which the relay request for the apparatus detection request has been transferred, transferring the received apparatus detection response to the arbitrary communication apparatus which is the transmission source of the relay request for the apparatus detection request, and the communication apparatus having the connection support server function is the only apparatus on the network including the plurality of subnetworks that transfers the relay request for the apparatus detection request from the arbitrary communication apparatus to communication apparatuses on subnetworks of the network that are different from the subnetwork to which the arbitrary communication apparatus is connected.

2. The communication apparatus having the connection support server function according to claim 1, wherein the processor further includes:

an apparatus detection request transmission section for multicasting or broadcasting, on the subnetwork of the communication apparatus having the connection support server function, the apparatus detection request for a desired communication apparatus; and an apparatus detection response receiving section for receiving the apparatus detection response, wherein in the case where the apparatus detection response receiving section does not receive the apparatus detection response to the apparatus detection request:

the relay request transfer section transmits the relay request for the apparatus detection request, to the another communication apparatus on the different subnetwork; and the apparatus detection response receiving section receives the apparatus detection response to the relay request for the apparatus detection request, thereby detecting the desired communication apparatus.

3. The communication apparatus having the connection support server function according to claim 1, wherein when receiving, from the arbitrary communication apparatus on the subnetwork that is different from the arbitrary subnetwork to which the communication apparatus having the connection support server function is connected, the relay request for the apparatus detection request, the relay request transfer section performs an apparatus detection on the subnetwork the communication apparatus having the connection support server function, by multicasting or broadcasting the apparatus detection request, and transfers the relay request for the apparatus detection request, to a communication apparatus on all other subnetworks.

4. The communication apparatus having the connection support server function according to claim 1, wherein when the relay request transfer section has received, on the arbitrary subnetwork to which the communication apparatus having the connection support server function is connected, a multicasted or broadcasted apparatus detection request from the arbitrary communication apparatus that is on the arbitrary subnetwork to which the communication apparatus having the connection support server function is connected, the relay request transfer section transmits the relay request for the apparatus detection request, to the another communication apparatus on the different subnetwork.

5. The communication apparatus having the connection support server function according to claim 1, wherein the relay request transfer section stores information about communication apparatuses, and when receiving the relay request for the apparatus detection request, the relay request transfer section determines, based on the information about the communication apparatuses, the another communication apparatus to which the relay request for the apparatus detection request is to be transferred.

6. The communication apparatus having the connection support server function according to claim 1, wherein the processor further includes a relay rejection response receiving section for receiving a rejection response to the relay request for the apparatus detection request, wherein when receiving the rejection response, the relay rejection response receiving section transfers the relay request for the apparatus detection request, to a different communication apparatus that is different from the another communication apparatus which is a transmission source of the rejection response, the different communication apparatus existing on a same subnetwork as that of the another communication apparatus which is the transmission source of the rejection response.

7. A communication apparatus which is, in a network including a plurality of subnetworks connected via a plurality of network address translation (NAT) devices, connected to an arbitrary subnetwork in the network and which has an established communication path with a first communication apparatus which has a communication path connected to a second communication apparatus on the network and which has a connection support server function, the communication apparatus connected to the arbitrary subnetwork comprising processor including:

an apparatus detection request transmission section for multicasting or broadcasting, on the arbitrary subnetwork thereof, an apparatus detection request for a desired communication apparatus;

a relay request transmission section for transmitting a relay request for the apparatus detection request, to the first communication apparatus having the connection support server function; and an apparatus detection response receiving section for receiving an apparatus detection response, wherein the apparatus detection response receiving section is operable to receive the apparatus detection response from the desired communication apparatus or from the first communication apparatus having the connection support server function, thereby detecting the desired communication apparatus, and the first communication apparatus having the connection support server function is the only apparatus on the network including the plurality of subnetworks that transfers the relay request for the apparatus detection request from the communication apparatus to communication apparatuses on subnetworks of the network that are different from the arbitrary network to which the communication apparatus is connected.

8. The communication apparatus according to claim 7, wherein in the case where the apparatus detection response receiving section does not receive the apparatus detection response to the apparatus detection request, the relay request transmission section transmits the relay request for the apparatus detection request, to the first communication apparatus having the connection support server function.

9. The communication apparatus according to claim 7, wherein at a same time as the apparatus detection request transmission section multicasts or broadcasts the apparatus detection request on the arbitrary subnetwork thereof, the relay request transmission section transmits the relay request for the apparatus detection request, to the first communication apparatus having the connection support server function.

10. The communication apparatus according to claim 7, wherein the processor further includes a relay request processing section for multicasting or broadcasting another apparatus detection request on the arbitrary subnetwork thereof when receiving, from the first communication apparatus having the connection support server function, a relay request for the another apparatus detection request, wherein
when the apparatus detection response receiving section has received the apparatus detection response to the relay request for the another apparatus detection request, the relay request processing section transfers the received apparatus detection response to the first communication apparatus having the connection support server function.

11. The communication apparatus according to claim 10, wherein the processor further includes a relay rejection response transmission section for, when the relay request processing section has received, from the first communication apparatus having the connection support server function, the relay request for the another apparatus detection request and determined that a processing capability of the relay request processing section is insufficient for multicasting or broadcasting the another apparatus detection request on the arbitrary subnetwork thereof, transmitting, to the first communication apparatus having the connection support server function, a rejection response to the relay request for the another apparatus detection request.

12. A method to be executed by a communication apparatus having a connection support server function, the communication apparatus having the connection support server function being, in a network including a plurality of subnetworks connected via a plurality of network address translation (NAT) devices, connected to an arbitrary subnetwork in the network and having a communication path connected to another communication apparatus that is connected to a different subnetwork that is different from the arbitrary subnetwork to which the communication apparatus having the connection support server function is connected, the method comprising:
a relay request transfer step of, when receiving from an arbitrary communication apparatus a relay request for an apparatus detection request, transferring to the another communication apparatus the relay request for the apparatus detection request; and
an apparatus detection response transfer step of, when receiving an apparatus detection response, transferring the received apparatus detection response to the arbitrary communication apparatus which is a transmission source of the relay request for the apparatus detection request, wherein
when receiving the relay request for the apparatus detection request, the transferring of the relay request transfer step comprises transferring the relay request for the apparatus detection request, to the another arbitrary communication apparatus connected to the different subnetwork that is different from a subnetwork to which the arbitrary communication apparatus which is the transmission source of the relay request for the apparatus detection request is connected,
the transferring of the apparatus detection response transfer step having the connection support server function comprises, when receiving the apparatus detection response from the another communication apparatus to which the relay request for the apparatus detection request has been transferred, transferring the received apparatus detection response to the arbitrary communication apparatus which is the transmission source of the relay request for the apparatus detection request, and
the communication apparatus executing the method having the connection support server function is the only apparatus on the network including the plurality of subnetworks that transfers the relay request for the apparatus detection request from the arbitrary communication apparatus to communication apparatuses on subnetworks of the network that are different from the subnetwork to which the arbitrary communication apparatus is connected.

13. A method to be executed by a communication apparatus which is, in a network including a plurality of subnetworks connected via a plurality of network address translation (NAT) devices, connected to an arbitrary subnetwork in the network and which has an established communication path with a first communication apparatus which has a communication path connected to a second communication apparatus on the network and which has a connection support server function, the method comprising:
an apparatus detection request transmission step of multicasting or broadcasting, on the arbitrary subnetwork thereof, an apparatus detection request for a desired communication apparatus;
a relay request transmission step of transmitting a relay request for the apparatus detection request, to the first communication apparatus having the connection support server function; and
an apparatus detection response receiving step of receiving an apparatus detection response, wherein
the receiving of the apparatus detection response receiving step comprises receiving the apparatus detection response from the desired communication apparatus or from the first communication apparatus having the connection support server function, thereby detecting the desired communication apparatus, and
the first communication apparatus having the connection support server function is the only apparatus on the network including the plurality of subnetworks that transfers the relay request for the apparatus detection request from the communication apparatus to communication apparatuses on subnetworks of the network that are different from the arbitrary network to which the communication apparatus is connected.

14. A non-transitory storage medium that stores software executable by a communication apparatus having a connection support server function, the communication apparatus having the connection support server function being, in a network including a plurality of subnetworks connected via a plurality of network address translation (NAT) devices, connected to an arbitrary subnetwork in the network and having a communication path connected to another communication apparatus that is connected to a different subnetwork that is different from the arbitrary subnetwork to which the communication apparatus having the connection support server function is connected, the software causing the communication apparatus to execute a method comprising:

a relay request transfer step of, when receiving from an arbitrary communication apparatus a relay request for an apparatus detection request, transferring to the another communication apparatus the relay request for the apparatus detection request; and an apparatus detection response transfer step of, when receiving an apparatus detection response, transferring the received apparatus detection response to the arbitrary communication apparatus which is a transmission source of the relay request for the apparatus detection request, wherein when receiving the relay request for the apparatus detection request, the transferring of the relay request transfer step comprises transferring the relay request for the apparatus detection request, to the another arbitrary communication apparatus connected to the different subnetwork that is different from a subnetwork to which the arbitrary communication apparatus which is the transmission source of the relay request for the apparatus detection request is connected, the transferring of the apparatus detection response transfer step having the connection support server function comprises, when receiving the apparatus detection response from the another communication apparatus to which the relay request for the apparatus detection request has been transferred, transferring the received apparatus detection response to the arbitrary communication apparatus which is the transmission source of the relay request for the apparatus detection request, and the communication apparatus executing the method having the connection support server function is the only apparatus on the network including the plurality of subnetworks that transfers the relay request for the apparatus detection request from the arbitrary communication apparatus to communication apparatuses on subnetworks of the network that are different from the subnetwork to which the arbitrary communication apparatus is connected.

15. A non-transitory storage medium that stores software executable by a communication apparatus which is, in a network including a plurality of subnetworks connected via a plurality of network address translation (NAT) devices, connected to an arbitrary subnetwork in the network and which has an established communication path with a first communication apparatus which has a communication path connected to a second communication apparatus on the network and which has a connection support server function, the software causing the communication apparatus to execute a method comprising:

an apparatus detection request transmission step of multicasting or broadcasting, on the arbitrary subnetwork thereof, an apparatus detection request for a desired communication apparatus;

a relay request transmission step of transmitting a relay request for the apparatus detection request, to the first communication apparatus having the connection support server function; and an apparatus detection response receiving step of receiving an apparatus detection response, wherein the receiving of the apparatus detection response receiving step comprises receiving the apparatus detection response from the desired communication apparatus or from the first communication apparatus having the connection support server function, thereby detecting the desired communication apparatus, and the first communication apparatus having the connection support server function is the only apparatus on the network including the plurality of subnetworks that transfers the relay request for the apparatus detection request from the communication apparatus to communication apparatuses on subnetworks of the network that are different from the arbitrary network to which the communication apparatus is connected.

16. A communication apparatus which is, in a network including a plurality of subnetworks connected via a plurality of network address translation (NAT) devices, connected to an arbitrary subnetwork in the network and which has an established communication path with a first communication apparatus which has a communication path connected to a second communication apparatus on the network and which has a connection support server function, the communication apparatus comprising a processor including:

a relay request transmission section for transmitting a relay request for an apparatus detection request for a desired communication apparatus, to the first communication apparatus having the connection support server function; and an apparatus detection response receiving section for receiving an apparatus detection response, wherein the apparatus detection response receiving section is operable to receive the apparatus detection response from the first communication apparatus having the connection support server function, thereby detecting the desired communication apparatus, and the first communication apparatus having the connection support server function is the only apparatus on the network including the plurality of subnetworks that transfers the relay request for the apparatus detection request from the communication apparatus to communication apparatuses on subnetworks of the network that are different from the arbitrary network to which the communication apparatus is connected.

* * * * *